United States Patent
Chen

(10) Patent No.: US 9,151,931 B1
(45) Date of Patent: Oct. 6, 2015

(54) IMAGE CAPTURING OPTICAL LENS ASSEMBLY, IMAGE CAPTURING DEVICE AND MOBILE TERMINAL

(71) Applicant: LARGAN PRECISION CO., LTD., Taichung (TW)

(72) Inventor: Wei-Yu Chen, Taichung (TW)

(73) Assignee: LARGAN PRECISION CO., LTD., Taichung (TW)

( * ) Notice: Subject to any disclaimer, the term of this patent is extended or adjusted under 35 U.S.C. 154(b) by 0 days.

(21) Appl. No.: 14/321,920

(22) Filed: Jul. 2, 2014

(30) Foreign Application Priority Data

Apr. 29, 2014 (TW) .............................. 103115378 A

(51) Int. Cl.
*G02B 9/60* (2006.01)
*G02B 13/00* (2006.01)
*H04N 5/372* (2011.01)
*H04N 5/374* (2011.01)

(52) U.S. Cl.
CPC ............ *G02B 13/0045* (2013.01); *H04N 5/372* (2013.01); *H04N 5/374* (2013.01)

(58) Field of Classification Search
CPC ................................ G02B 9/60; G02B 13/0045
See application file for complete search history.

(56) References Cited

U.S. PATENT DOCUMENTS

| 7,864,454 B1 | 1/2011 | Tang et al. |
| 2014/0153115 A1* | 6/2014 | Hagiwara ..................... 359/714 |

FOREIGN PATENT DOCUMENTS

| TW | 201106040 A | 2/2011 |
| WO | 2012020554 | 2/2012 |
| WO | 2013063097 | 5/2013 |

\* cited by examiner

*Primary Examiner* — Joseph P Martinez
(74) *Attorney, Agent, or Firm* — McClure, Qualey & Rodack, LLP

(57) ABSTRACT

An image capturing optical lens assembly includes, in order from an object side to an image side, a first lens element, a second lens element, a third lens element, a fourth lens element and a fifth lens element. The first lens element with positive refractive power has an object-side surface being convex in a paraxial region thereof. The second lens element has negative refractive power. The third lens element has refractive power. The forth lens element with positive refractive power has an object-side surface being convex in a paraxial region thereof and an image-side surface being concave or planar in a paraxial region thereof. The fifth lens element with negative refractive power has an object-side surface being concave in a paraxial region thereof and an image-side surface being concave in a paraxial region thereof.

18 Claims, 22 Drawing Sheets

IMAGE CAPTURING OPTICAL LENS ASSEMBLY, IMAGE CAPTURING DEVICE AND MOBILE TERMINAL

RELATED APPLICATIONS

This application claims priority to Taiwan Application Serial Number 103115378, filed Apr. 29, 2014, which is incorporated by reference herein in its entirety.

BACKGROUND

1. Technical Field

The present disclosure relates to an image capturing optical lens assembly and an image capturing device. More particularly, the present disclosure relates to a compact image capturing optical lens assembly and an image capturing device applicable to mobile terminals.

2. Description of Related Art

In recent years, with the popularity of mobile terminals having camera functionalities, the demand of miniaturized optical systems has been increasing. The sensor of a conventional optical system is typically a CCD (Charge-Coupled Device) or a CMOS (Complementary Metal-Oxide-Semiconductor) sensor. As the advanced semiconductor manufacturing technologies have allowed the pixel size of sensors to be reduced and compact optical systems have gradually evolved toward the field of higher megapixels, there is an increasing demand for compact optical systems featuring better image quality.

A conventional optical system employed in a portable electronic product mainly adopts a four-element lens structure. Due to the popularity of mobile terminals with high-end specifications, such as smart phones, tablet personal computers and wearable apparatus, the requirements for high resolution and image quality of present compact optical systems increase significantly. However, the conventional optical systems cannot satisfy these requirements of the compact optical systems.

Other conventional compact optical systems with five-element lens structure are also developed. However, it is not favorable for correcting high-order aberration and manufacturing the lens elements, since the fourth lens element with positive refractive power usually has an image-side surface being convex which might result in excessively high curvature. Moreover, it is unfavorable for arranging the lens elements under a compact optical system size which might lead to a worse image quality due to interference or stray light.

SUMMARY

According to one aspect of the present disclosure, an image capturing optical lens assembly includes, in order from an object side to an image side, a first lens element, a second lens element, a third lens element, a fourth lens and a fifth lens element. The first lens element with positive refractive power has an object-side surface being convex in a paraxial region thereof. The second lens element has negative refractive power. The third lens element has refractive power. The fourth lens element with positive refractive power has an object-side surface being convex in a paraxial region thereof and an image-side surface being concave or planar in a paraxial region thereof. Both of the object-side surface and the image-side surface of the fourth lens element are aspheric. At least one of the object-side surface and the image-side surface of the fourth lens element has at least one inflection point thereon. The fifth lens element with negative refractive power has an object-side surface being concave in a paraxial region thereof and an image-side surface being concave in a paraxial region thereof. Both of the object-side surface and the image-side surface of the fifth lens element are aspheric. The image-side surface of the fifth lens element has at least one convex shape in an off-axial region thereon. The image capturing optical lens assembly has a total of five lens elements with refractive power. An air gap in a paraxial region is arranged between any two of the first lens element, the second lens element, the third lens element, the fourth lens element, and the fifth lens element that are adjacent to each other. When a focal length of the image capturing optical lens assembly is f, a focal length of the fourth lens element is f4, a curvature radius of the image-side surface of the fourth lens element is R8, a curvature radius of the object-side surface of the fifth lens element is R9, a curvature radius of the image-side surface of the fifth lens element is R10, an axial distance between the fourth lens element and the fifth lens element is T45, and a central thickness of the fifth lens element is CT5, the following conditions are satisfied:

$1.20 < (f/R10) - (f/R9);$ $0 \leq f4/R8;$ $0.4 < f/f4;$ and $1.1 < T45/CT5.$

According to another aspect of the present disclosure, an image capturing device includes the image capturing optical lens assembly according to the aforementioned aspect and an image sensor, wherein the image sensor is located on or near an image plane of the image capturing optical lens assembly.

According to yet another aspect of the present disclosure, a mobile terminal includes the image capturing device according to the foregoing aspect.

BRIEF DESCRIPTION OF THE DRAWINGS

The disclosure can be more fully understood by reading the following detailed description of the embodiment, with reference made to the accompanying drawings as follows.

DETAILED DESCRIPTION

Figure 1:
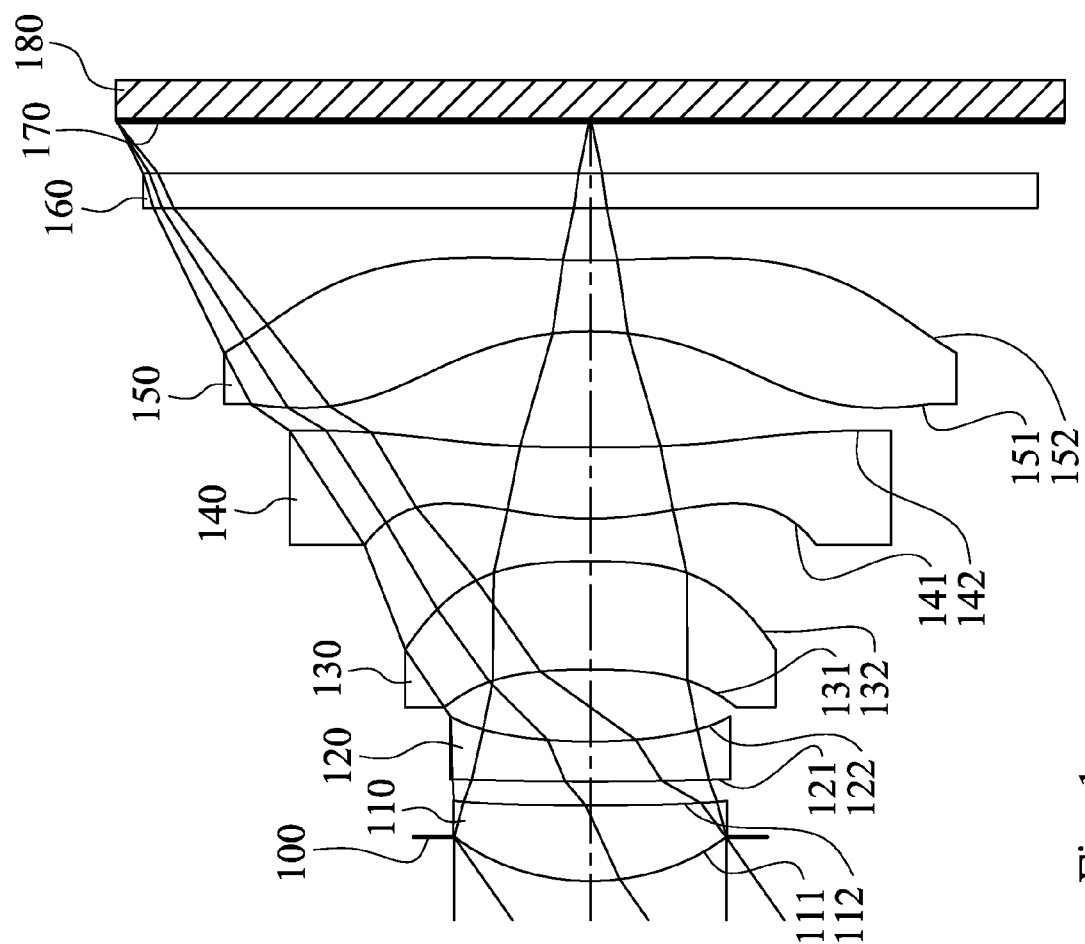
FIG. 1 is a schematic view of an image capturing device according to the 1st embodiment of the present disclosure.

An image capturing optical lens assembly includes, in order from an object side to an image side, a first lens element, a second lens element, a third lens element, a fourth lens element and a fifth lens element. The image capturing optical lens assembly has a total of five lens elements with refractive power.

According to the image capturing optical lens assembly of the present disclosure, an air gap in a paraxial region is arranged between any two of the first lens element, the second lens element, the third lens element, the fourth lens element, and the fifth lens element that are adjacent to each other, that is, each of the first through fifth lens elements of the image capturing optical lens assembly is a single and non-cemented lens element. Moreover, the manufacturing process of the cemented lenses is more complex than the non-cemented lenses. In particular, an image-side surface of one lens element and an object-side surface of the following lens element need to have accurate curvature to ensure these two lens elements will be highly cemented. However, during the cementing process, those two lens elements might not be highly cemented due to displacement and it is thereby not favorable for the image quality of the image capturing optical lens assembly. Therefore, there is an air gap in a paraxial region between any two of the first lens element, the second lens element, the third lens element, the fourth lens element, and the fifth lens element that are adjacent to each other in the present disclosure for improving the problem generated by the cemented lens elements.

The first lens element with positive refractive power has an object-side surface being convex in a paraxial region thereof. Therefore, the total track length of the image capturing optical lens assembly can be reduced by properly adjusting the positive refractive power of the first lens element.

The second lens element with negative refractive power can have an image-side surface being concave in a paraxial region thereof. Therefore, the aberration generated from the first lens element can be corrected to improve the image quality.

The third lens element can have an object-side surface having at least one concave shape in an off-axial region thereon and an image-side surface having at least one convex shape in an off-axial region thereon. Therefore, it is favorable for reducing the incident angle of the light projecting onto an image sensor so as to increase the responding efficiency of the image sensor.

The fourth lens element with positive refractive power has an object-side surface being convex in a paraxial region thereof and an image-side surface being concave or planar in a paraxial region thereof. Both of the object-side surface and the image-side surface of the fourth lens element are aspheric. Therefore, the astigmatism can be corrected. Furthermore, at least one of the object-side surface and the image-side surface of the fourth lens element has at least one inflection point thereon. Therefore, the aberration of the off-axis can be corrected effectively for enhancing the image quality in an off-axial region.

The fifth lens element with negative refractive power has an object-side surface being concave in a paraxial region thereof and an image-side surface being concave in a paraxial region thereof. Therefore, it is favorable for reducing the back focal length of the image capturing optical lens assembly so as to allow sufficient arranging space under limited total track length, as well as reducing the interference or stray light to improve the image quality. Furthermore, the image-side surface of the fifth lens element has at least one convex shape in an off-axial region thereon. Therefore, it is favorable for effectively correcting the aberration of the off-axis so as to maintain superior image quality.

Furthermore, at least five of the object-side surface and the image-side surface among the first lens element, the second lens element, the third lens element, the fourth lens element, and the fifth lens element have at least one inflection point thereon. Therefore, the aberration of the off-axis can be corrected effectively to improve the image quality in the off-axial region.

When a focal length of the image capturing optical lens assembly is f, a curvature radius of the object-side surface of the fifth lens element is R9, and a curvature radius of the image-side surface of the fifth lens element is R10, the following condition is satisfied: $1.20 < (f/R10) - (f/R9)$. Therefore, it is favorable for reducing the back focal length of the image capturing optical lens assembly so as to allow sufficient arranging space under limited total track length. Preferably, the following condition is satisfied: $1.80 < (f/R10) - (f/R9) < 5.00$.

When a focal length of the fourth lens element is f4, and a curvature radius of the image-side surface of the fourth lens element is R8, the following condition is satisfied: $0 \leq f4/R8$. Therefore, it is favorable for correcting astigmatism and spherical aberration of the image capturing optical lens assembly so as to achieve superior image quality.

When the focal length of the image capturing optical lens assembly is f, and the focal length of the fourth lens element is f4, the following condition is satisfied: $0.4 < f/f4$. Therefore, the photosensitivity of the image capturing optical lens assembly can be reduced to improve the manufacturability. Preferably, the following condition is satisfied: $0.75 < f/f4 < 1.50$.

When an axial distance between the fourth lens element and the fifth lens element is T45, and a central thickness of the fifth lens element is CT5, the following condition is satisfied: $1.1 < T45/CT5$. Therefore, it is favorable for manufacturing and assembling the lens elements so as to increase the manufacturing yield rate. Preferably, the following condition is satisfied: $1.25 < T45/CT5 < 2.50$.

When a central thickness of the second lens element is CT2, and the central thickness of the fifth lens element is CT5, the following condition is satisfied: $0.20 < CT2/CT5 < 1.0$. Therefore, it is favorable for the moldability and homogeneity of lens elements so as to increase the manufacturing yield rate.

When an Abbe number of the first lens element is V1, and an Abbe number of the third lens element is V3, the following condition is satisfied: $0.80 < V1/V3 < 1.50$. Therefore, it is favorable for correcting the chromatic aberration of the image capturing optical lens assembly so as to improve the image quality.

When an axial distance between the first lens element and the second lens element is T12, an axial distance between the second lens element and the third lens element is T23, an axial distance between the third lens element and the fourth lens element is T34, and the axial distance between the fourth lens element and the fifth lens element is T45, T45 is greater than T12, T23 and T34. Therefore, it is favorable for space arrangement of the image capturing optical lens assembly by properly adjusting the axial distances between lens elements.

When a curvature radius of the object-side surface of the fourth lens element is R7, and the focal length of the image capturing optical lens assembly is f, the following condition is satisfied: $0.20 < R7/f < 0.70$. Therefore, it is favorable for reducing the astigmatism so as to maintain the image quality.

When a focal length of the third lens element is f3, and the focal length of the fourth lens element is f4, the following condition is satisfied: $|f4/f3| < 0.50$. Therefore, it is favorable for correcting the aberration of the image capturing optical lens assembly so as to improve the image quality.

When a curvature radius of the object-side surface of the second lens element is R3, and a curvature radius of the image-side surface of the second lens element is R4, the following condition is satisfied: $0.15 < R4/R3 < 0.35$. Therefore, it is favorable for correcting the aberration by properly adjusting the surface shape of the second lens element.

When a central thickness of the first lens element is CT1, and a central thickness of the third lens element is CT3, the following condition is satisfied: $1.60 < CT3/CT1 < 3.50$. Therefore, it is favorable for the moldability and homogeneity of lens elements so as to increase the manufacturing yield rate.

When the curvature radius of the object-side surface of the fifth lens element is R9, and the curvature radius of the image-side surface of the fifth lens element is R10, the following condition is satisfied: $-1.00 < (R9+R10)/(R9-R10) < -0.25$. Therefore, it is favorable for reducing the back focal length of the image capturing optical lens assembly by properly adjusting the surface shape of the fifth lens element so as to keep the image capturing optical lens assembly compact.

When a vertical distance between a non-axial critical point on the object-side surface of the fourth lens element and an optical axis is Y41, and a central thickness of the fourth lens element is CT4, the following condition is satisfied: $1.50 < Y41/CT4 < 3.50$. Therefore, the aberration of the optical axis and the off-axis can be effectively corrected, and the distortion of the image capturing optical lens assembly can be reduced.

According to the image capturing optical lens assembly of the present disclosure, the lens elements thereof can be made of plastic or glass material. When the lens elements are made of plastic material, the manufacturing cost can be effectively reduced. When the lens elements are made of glass material, the distribution of the refractive power of the image capturing optical lens assembly may be more flexible to design. Furthermore, surfaces of each lens element can be arranged to be aspheric, since the aspheric surface of the lens element is easy to form a shape other than spherical surface so as to have more controllable variables for eliminating the aberration thereof, and to further decrease the required number of the lens elements. Therefore, the total track length of the image capturing optical lens assembly can also be reduced.

According to the image capturing optical lens assembly of the present disclosure, each of an object-side surface and an image-side surface has a paraxial region and an off-axial region. The paraxial region refers to the region of the surface where light rays travel close to the optical axis, and the off-axial region refers to the region of the surface away from the paraxial region. Particularly, when the lens element has a convex surface, it indicates that the surface is convex in the paraxial region thereof; when the lens element has a concave surface, it indicates that the surface is concave in the paraxial region thereof.

According to the image capturing optical lens assembly of the present disclosure, the image capturing optical lens assembly can include at least one stop, such as an aperture stop, a glare stop or a field stop. The glare stop or the field stop is for eliminating the stray light and thereby improving the image resolution thereof.

According to the image capturing optical lens assembly of the present disclosure, a critical point is a non-axial point of the lens surface where its tangent is perpendicular to an optical axis.

According to the image capturing optical lens assembly of the present disclosure, an aperture stop can be configured as a front stop or a middle stop. A front stop disposed between an imaged object and the first lens element can provide a longer distance between an exit pupil of the image capturing optical lens assembly and the image plane and thereby improves the image-sensing efficiency of an image sensor. A middle stop disposed between the first lens element and the image plane is favorable for enlarging the field of view of the image capturing optical lens assembly and thereby provides a wider field of view for the same.

According to the image capturing optical lens assembly of the present disclosure, the image capturing optical lens assembly can be optionally applied to moving focus optical systems. Furthermore, the image capturing optical lens assembly is featured with good correction ability and high image quality, and can be applied to 3D (three-dimensional) image capturing applications, in products such as digital cameras, mobile devices, digital tablets, wearable devices and other mobile terminals.

According to the present disclosure, an image capturing device is provided. The image capturing device includes the aforementioned image capturing optical lens assembly according to the present disclosure and an image sensor, wherein the image sensor is located on or near an image plane of the aforementioned image capturing optical lens assembly. In the image capturing optical lens assembly of the image capturing device, the image-side surface of the fourth lens element is concave or planar in the paraxial region thereof, so that it reduces the difficulty of high-order aberration correction and lens elements manufacturability due to excessively high curvature of the image-side surface of the fourth lens element. Furthermore, both of the object-side surface and the image-side surface of the fifth lens elements are concave thereof, so that it is favorable for reducing the back focal length and allowing sufficient arranging space under the limited total track length, as well as reducing the interference or stray light so as to improve the image quality. Preferably, the image capturing device can further include a barrel member, a holder member or a combination thereof.

According to the present disclosure, a mobile terminal is provided, wherein the mobile terminal includes the aforementioned image capturing device. Therefore, it is favorable for keeping a compact size thereof, correcting the high-order aberration, reducing the difficulty of lens elements manufacturability, arranging lens elements, and reducing the interference or stray light. Preferably, the mobile terminal can further include but not limited to a control unit, a display, a storage unit, a random access memory unit (RAM) or a combination thereof.

According to the above description of the present disclosure, the following 1st-12th specific embodiments are provided for further explanation.

1st Embodiment

Figure 2:
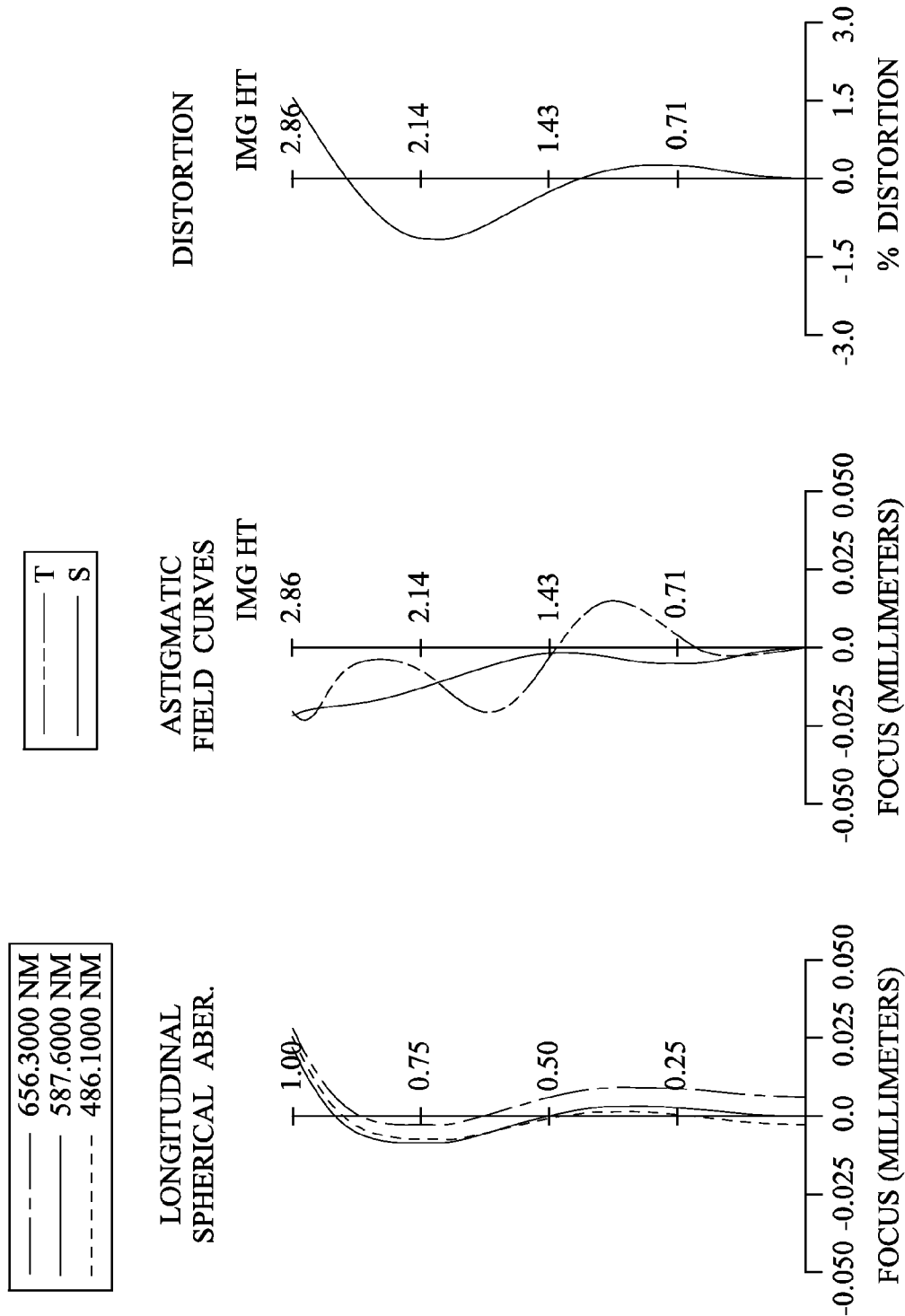
FIG. 2 shows spherical aberration curves, astigmatic field curves and a distortion curve of the image capturing device according to the 1st embodiment.

FIG. 1 is a schematic view of an image capturing device according to the 1st embodiment of the present disclosure. FIG. 2 shows, in order from left to right, spherical aberration curves, astigmatic field curves and a distortion curve of the image capturing device according to the 1st embodiment.

In FIG. 1, the image capturing device includes the image capturing optical lens assembly (its reference numeral is omitted) of the present disclosure and an image sensor 180. The image capturing optical lens assembly includes, in order from an object side to an image side, an aperture stop 100, a first lens element 110, a second lens element 120, a third lens element 130, a fourth lens element 140, a fifth lens element 150, an IR-cut filter 160 and an image plane 170. The image sensor 180 is located on or near the image plane 170 of the image capturing optical lens assembly. The image capturing optical lens assembly has a total of five lens elements (110-150) with refractive power. Moreover, there is an air gap in a paraxial region between any two of the first lens element 110, the second lens element 120, the third lens element 130, the fourth lens element 140, and the fifth lens element 150 that are adjacent to each other.

The first lens element 110 with positive refractive power has an object-side surface 111 being convex in a paraxial region thereof and an image-side surface 112 being concave in a paraxial region thereof. The first lens element 110 is made of glass material and has the object-side surface 111 and the image-side surface 112 being both aspheric.

The second lens element 120 with negative refractive power has an object-side surface 121 being convex in a paraxial region thereof and an image-side surface 122 being concave in a paraxial region thereof. The second lens element 120 is made of plastic material and has the object-side surface 121 and the image-side surface 122 being both aspheric. Furthermore, the object-side surface 121 of the second lens element 120 has at least one inflection point.

The third lens element 130 with negative refractive power has an object-side surface 131 being concave in a paraxial region thereof and an image-side surface 132 being convex in a paraxial region thereof. The third lens element 130 is made of plastic material and has the object-side surface 131 and the image-side surface 132 being both aspheric. Furthermore, the image-side surface 132 of the third lens element 130 has at least one inflection point, and the image-side surface 132 of the third lens element 130 has at least one convex shape in an off-axial region thereon.

The fourth lens element 140 with positive refractive power has an object-side surface 141 being convex in a paraxial region thereof and an image-side surface 142 being concave in a paraxial region thereof. The fourth lens element 140 is made of plastic material and has the object-side surface 141 and the image-side surface 142 being both aspheric. Furthermore, both of the object-side surface 141 and the image-side surface 142 of the fourth lens element 140 have at least one inflection point.

The fifth lens element 150 with negative refractive power has an object-side surface 151 being concave in a paraxial region thereof and an image-side surface 152 being concave in a paraxial region thereof. The fifth lens element 150 is made of plastic material and has the object-side surface 151 and the image-side surface 152 being both aspheric. Furthermore, both of the object-side surface 151 and the image-side surface 152 of the fifth lens element 150 have at least one inflection point, and the image-side surface 152 of the fifth lens element 150 has at least one convex shape in an off-axial region thereon.

The IR-cut filter 160 is made of glass material and located between the fifth lens element 150 and the image plane 170, and will not affect a focal length of the image capturing optical lens assembly.

The equation of the aspheric surface profiles of the aforementioned lens elements of the 1st embodiment is expressed as follows:

$$X(Y) = (Y^2/R)/(1+sqrt(1-(1+k)\times(Y/R)^2)) + \sum_i (Ai)\times(Y^i),$$

where,

X is the relative distance between a point on the aspheric surface spaced at a distance Y from the optical axis and the tangential plane at the aspheric surface vertex on the optical axis;

Y is the vertical distance from the point on the aspheric surface to the optical axis;

R is the curvature radius;

k is the conic coefficient; and

Ai is the i-th aspheric coefficient.

In the image capturing optical lens assembly of the image capturing device according to the 1st embodiment, when a focal length of the image capturing optical lens assembly is f, an f-number of the image capturing optical lens assembly is Fno, and half of a maximal field of view of the image capturing optical lens assembly is HFOV, these parameters have the following values: f=4.01 mm; Fno=2.45; and HFOV=35.0 degrees.

In the image capturing optical lens assembly of the image capturing device according to the 1st embodiment, when an Abbe number of the first lens element 110 is V1, and an Abbe number of the third lens element 130 is V3, the following condition is satisfied: V1/V3=1.13.

In the image capturing optical lens assembly of the image capturing device according to the 1st embodiment, when a central thickness of the first lens element 110 is CT1, and a central thickness of the third lens element 130 is CT3, the following condition is satisfied: CT3/CT1=1.43.

In the image capturing optical lens assembly of the image capturing device according to the 1st embodiment, when a central thickness of the second lens element 120 is CT2, and a central thickness of the fifth lens element 150 is CT5, the following condition is satisfied: CT2/CT5=0.56.

In the image capturing optical lens assembly of the image capturing device according to the 1st embodiment, when an axial distance between the fourth lens element 140 and the fifth lens element 150 is T45, and the central thickness of the fifth lens element 150 is CT5, the following condition is satisfied: T45/CT5=1.63.

Figure 19:
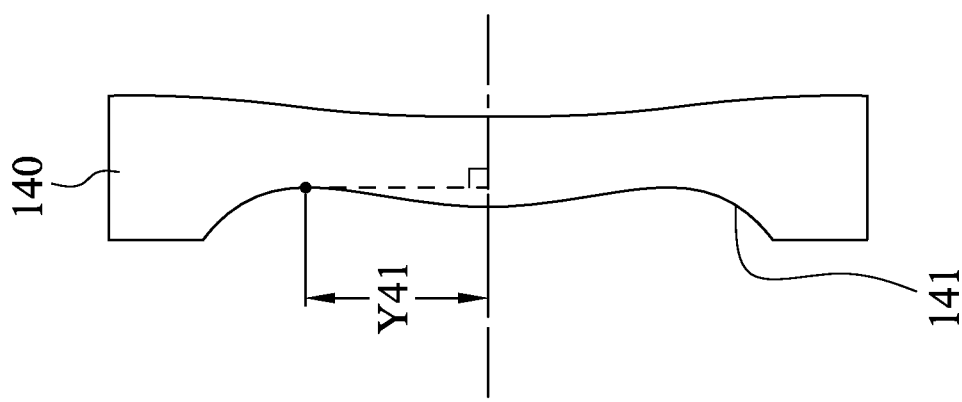
FIG. 19 shows Y41 according to the fourth lens element of the FIG. 1.

FIG. 19 shows a schematic view of a parameter Y41 of the fourth lens element 140 of the image capturing device of FIG. 1. In FIG. 19, when a vertical distance between a non-axial critical point on the object-side surface 141 of the fourth lens element 140 and an optical axis is Y41, and a central thickness of the fourth lens element 140 is CT4, the following condition is satisfied: Y41/CT4=2.00.

In the image capturing optical lens assembly of the image capturing device according to the 1st embodiment, when a curvature radius of the object-side surface 121 of the second lens element 120 is R3, and a curvature radius of the image-side surface 122 of the second lens element 120 is R4, the following condition is satisfied: R4/R3=0.18.

In the image capturing optical lens assembly of the image capturing device according to the 1st embodiment, when a curvature radius of the object-side surface 151 of the fifth lens element 150 is R9, and a curvature radius of the image-side surface 152 of the fifth lens element 150 is R10, the following condition is satisfied: (R9+R10)/(R9−R10)=−0.46.

In the image capturing optical lens assembly of the image capturing device according to the 1st embodiment, when a curvature radius of the object-side surface 141 of the fourth lens element 140 is R7, and the focal length of the image capturing optical lens assembly is f, the following condition is satisfied: R7/f=0.48.

In the image capturing optical lens assembly of the image capturing device according to the 1st embodiment, when a focal length of the fourth lens element 140 is f4, and a curvature radius of the image-side surface 142 of the fourth lens element 140 is R8, the following condition is satisfied: f4/R8=0.13.

In the image capturing optical lens assembly of the image capturing device according to the 1st embodiment, when the focal length of the image capturing optical lens assembly is f, the curvature radius of the object-side surface 151 of the fifth lens element 150 is R9, and the curvature radius of the image-side surface 152 of the fifth lens element 150 is R10, the following condition is satisfied: (f/R10)−(f/R9)=2.56.

In the image capturing optical lens assembly of the image capturing device according to the 1st embodiment, when the focal length of the image capturing optical lens assembly is f, and the focal length of the fourth lens element 140 is f4, the following condition is satisfied: f/f4=1.05.

In the image capturing optical lens assembly of the image capturing device according to the 1st embodiment, when a focal length of the third lens element 130 is f3, and the focal length of the fourth lens element 140 is f4, the following condition is satisfied: |f4/f3|=0.16.

In the image capturing optical lens assembly of the image capturing device according to the 1st embodiment, when an axial distance between the first lens element 110 and the second lens element 120 is T12, an axial distance between the second lens element 120 and the third lens element 130 is T23, an axial distance between the third lens element 130 and the fourth lens element 140 is T34, the axial distance between the fourth lens element 140 and the fifth lens element 150 is T45, and T45 is greater than T12, T23 and T34.

The detailed optical data of the 1st embodiment are shown in Table 1 and the aspheric surface data are shown in Table 2 below.

TABLE 1

1st Embodiment
f = 4.01 mm, Fno = 2.45, HFOV = 35.0 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.264 | | | | |
| 2 | Lens 1 | 1.455 | ASP | 0.456 | Glass | 1.542 | 62.9 | 2.90 |
| 3 | | 17.540 | ASP | 0.144 | | | | |
| 4 | Lens 2 | 16.858 | ASP | 0.240 | Plastic | 1.650 | 21.4 | −5.89 |
| 5 | | 3.103 | ASP | 0.437 | | | | |
| 6 | Lens 3 | −3.925 | ASP | 0.651 | Plastic | 1.530 | 55.8 | −23.19 |
| 7 | | −6.098 | ASP | 0.257 | | | | |
| 8 | Lens 4 | 1.943 | ASP | 0.431 | Plastic | 1.544 | 55.9 | 3.81 |
| 9 | | 28.571 | ASP | 0.698 | | | | |
| 10 | Lens 5 | −2.139 | ASP | 0.429 | Plastic | 1.530 | 55.8 | −2.90 |
| 11 | | 5.832 | ASP | 0.315 | | | | |
| 12 | IR-cut filter | Plano | | 0.210 | Glass | 1.517 | 64.2 | — |
| 13 | | Plano | | 0.317 | | | | |
| 14 | Image | Plano | | — | | | | |

Note:
Reference wavelength is 587.6 nm (d-line).

TABLE 2

Aspheric Coefficients

| Surface # | 2 | 3 | 4 | 5 | 6 |
|---|---|---|---|---|---|
| k = | 3.3148E−01 | −1.0000E+00 | −1.0000E+00 | 2.8920E−01 | 1.4524E+01 |
| A4 = | 7.1573E−04 | −2.5328E−03 | −5.0684E−02 | −1.8355E−02 | −1.9831E−01 |
| A6 = | 9.7690E−03 | 2.4091E−02 | 9.5224E−02 | 1.3280E−01 | 2.9167E−01 |
| A8 = | −1.5301E−03 | 1.2689E−02 | −2.6777E−02 | −5.6835E−02 | −8.1700E−01 |
| A10 = | 1.4098E−02 | −1.9008E−02 | −8.6382E−02 | 1.0646E−02 | 5.6683E−01 |
| A12 = | −4.5389E−03 | 2.9005E−02 | 3.5308E−02 | 1.1194E−01 | 1.1843E+00 |
| A14 = | 2.2113E−02 | 3.7437E−02 | 2.1552E−01 | −6.1206E−02 | −2.6094E+00 |
| A16 = | 1.0550E−02 | −3.9497E−02 | −2.8573E−01 | 2.3420E−02 | 1.5961E+00 |

TABLE 2-continued

Aspheric Coefficients

| Surface # | 7 | 8 | 9 | 10 | 11 |
|---|---|---|---|---|---|
| k =   | 1.7358E+01  | −8.6375E+00 | 3.5643E+01  | −2.5940E−01 | 3.3397E+00  |
| A4 =  | −4.7168E−01 | −1.0450E−01 | 9.9012E−02  | −9.4343E−02 | −1.2954E−01 |
| A6 =  | 6.4141E−01  | 7.5493E−02  | −7.1448E−02 | 9.7734E−02  | 6.3156E−02  |
| A8 =  | −1.3256E+00 | −1.8112E−01 | 5.3782E−03  | −2.0580E−02 | −2.6919E−02 |
| A10 = | 1.9874E+00  | 1.7401E−01  | 1.3016E−02  | −1.2336E−03 | 7.3548E−03  |
| A12 = | −1.8352E+00 | −9.8537E−02 | −6.1362E−03 | 1.1927E−03  | −1.2959E−03 |
| A14 = | 9.0023E−01  | 3.1084E−02  | 1.1256E−03  | −1.8246E−04 | 1.4433E−04  |
| A16 = | −1.7539E−01 | −4.2357E−03 | −7.6431E−05 | 9.4642E−06  | −7.5662E−06 |

In Table 1, the curvature radius, the thickness and the focal length are shown in millimeters (mm). Surface numbers 0-14 represent the surfaces sequentially arranged from the object-side to the image-side along the optical axis. In Table 2, k represents the conic coefficient of the equation of the aspheric surface profiles. A4-A16 represent the aspheric coefficients ranging from the 4th order to the 16th order. The tables presented below for each embodiment are the corresponding schematic parameter and aberration curves, and the definitions of the tables are the same as Table 1 and Table 2 of the 1st embodiment. Therefore, an explanation in this regard will not be provided again.

2nd Embodiment

Figure 3:
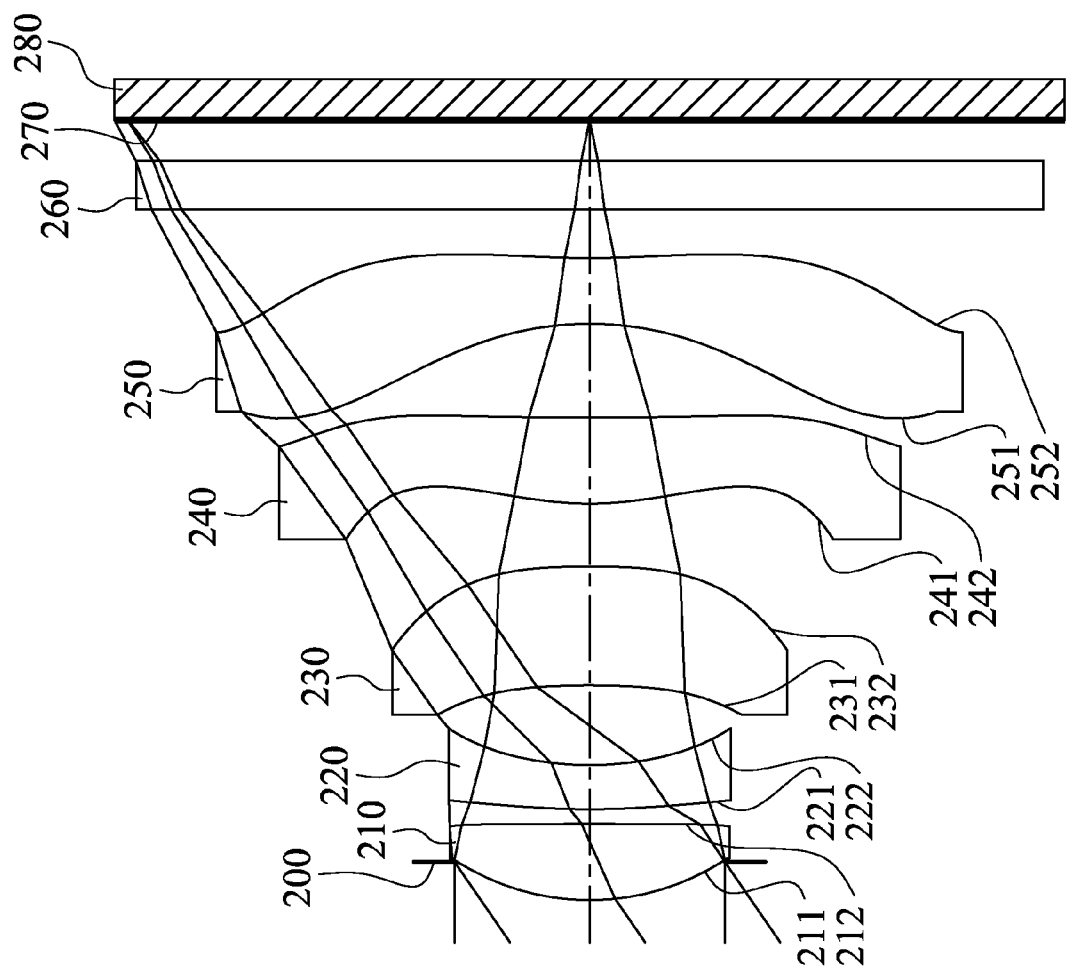
FIG. 3 is a schematic view of an image capturing device according to the 2nd embodiment of the present disclosure.
Figure 4:
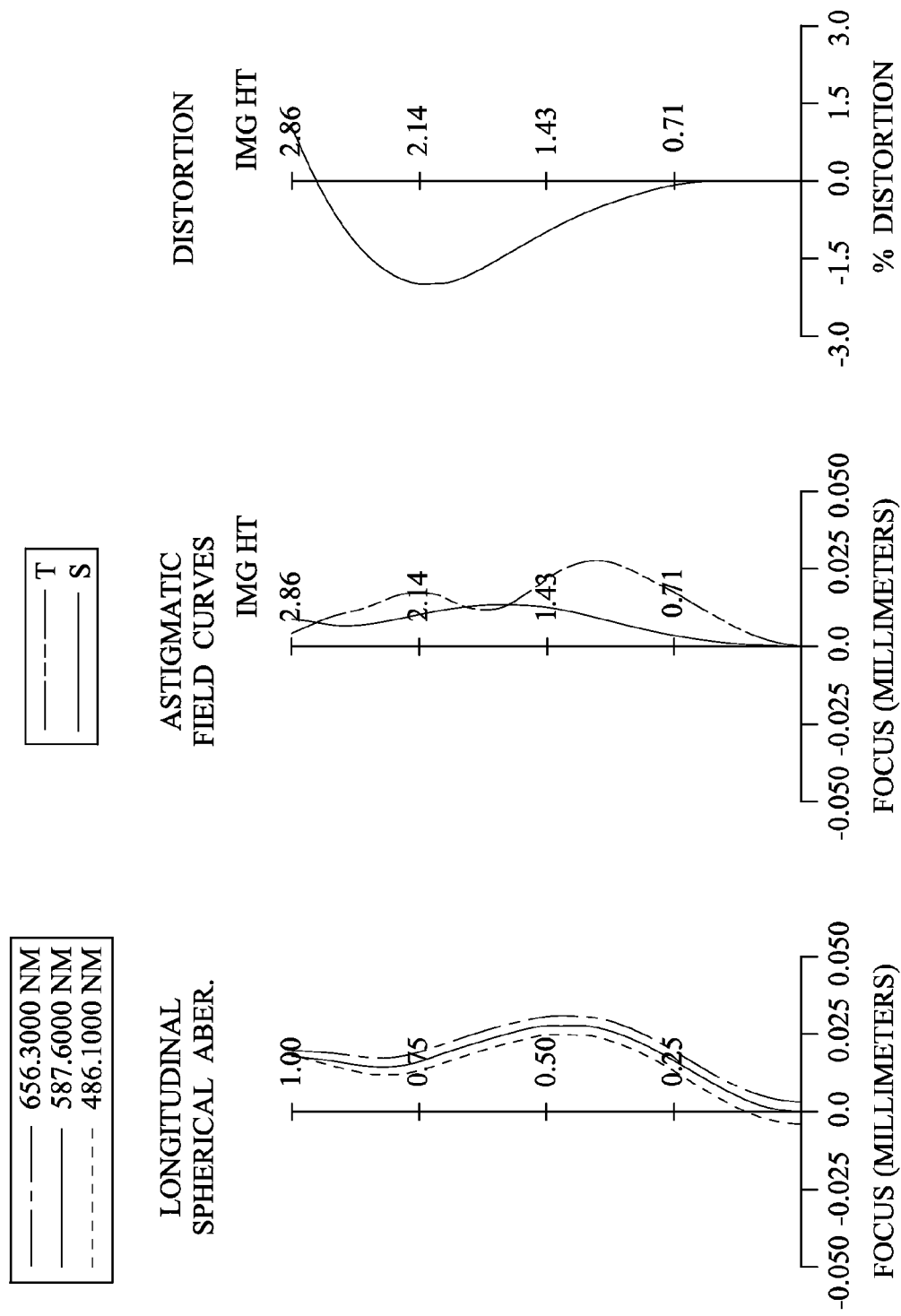
FIG. 4 shows spherical aberration curves, astigmatic field curves and a distortion curve of the image capturing device according to the 2nd embodiment.

FIG. 3 is a schematic view of an image capturing device according to the 2nd embodiment of the present disclosure. FIG. 4 shows, in order from left to right, spherical aberration curves, astigmatic field curves and a distortion curve of the image capturing device according to the 2nd embodiment.

In FIG. 3, the image capturing device includes the image capturing optical lens assembly (its reference numeral is omitted) of the present disclosure and an image sensor 280. The image capturing optical lens assembly includes, in order from an object side to an image side, an aperture stop 200, a first lens element 210, a second lens element 220, a third lens element 230, a fourth lens element 240, a fifth lens element 250, an IR-cut filter 260 and an image plane 270. The image sensor 280 is located on or near the image plane 270 of the image capturing optical lens assembly. The image capturing optical lens assembly has a total of five lens elements (210-250) with refractive power. Moreover, there is an air gap in a paraxial region between any two of the first lens element 210, the second lens element 220, the third lens element 230, the fourth lens element 240, and the fifth lens element 250 that are adjacent to each other.

The first lens element 210 with positive refractive power has an object-side surface 211 being convex in a paraxial region thereof and an image-side surface 212 being convex in a paraxial region thereof. The first lens element 210 is made of plastic material and has the object-side surface 211 and the image-side surface 212 being both aspheric.

The second lens element 220 with negative refractive power has an object-side surface 221 being convex in a paraxial region thereof and an image-side surface 222 being concave in a paraxial region thereof. The second lens element 220 is made of plastic material and has the object-side surface 221 and the image-side surface 222 being both aspheric. Furthermore, the object-side surface 221 of the second lens element 220 has at least one inflection point.

The third lens element 230 with negative refractive power has an object-side surface 231 being concave in a paraxial region thereof and an image-side surface 232 being convex in a paraxial region thereof. The third lens element 230 is made of plastic material and has the object-side surface 231 and the image-side surface 232 being both aspheric. Furthermore, the object-side surface 231 of the third lens element 230 has at least one inflection point, and the image-side surface 232 of the third lens element 230 has at least one convex shape in an off-axial region thereon.

The fourth lens element 240 with positive refractive power has an object-side surface 241 being convex in a paraxial region thereof and an image-side surface 242 being concave in a paraxial region thereof. The fourth lens element 240 is made of plastic material and has the object-side surface 241 and the image-side surface 242 being both aspheric. Furthermore, both of the object-side surface 241 and the image-side surface 242 of the fourth lens element 240 have at least one inflection point.

The fifth lens element 250 with negative refractive power has an object-side surface 251 being concave in a paraxial region thereof and an image-side surface 252 being concave in a paraxial region thereof. The fifth lens element 250 is made of plastic material and has the object-side surface 251 and the image-side surface 252 being both aspheric. Furthermore, both of the object-side surface 251 and the image-side surface 252 of the fifth lens element 250 have at least one inflection point, and the image-side surface 252 of the fifth lens element 250 has at least one convex shape in an off-axial region thereon.

The IR-cut filter 260 is made of glass material and located between the fifth lens element 250 and the image plane 270, and will not affect a focal length of the image capturing optical lens assembly.

The detailed optical data of the 2nd embodiment are shown in Table 3 and the aspheric surface data are shown in Table 4 below.

TABLE 3

2nd Embodiment
f = 4.09 mm, Fno = 2.45, HFOV = 34.5 deg.

| Surface # | | Curvature Radius | | Thickness | Material | Index | Abbe # | Focal Length |
|---|---|---|---|---|---|---|---|---|
| 0 | Object    | Plano   |     | Infinity |         |       |      |       |
| 1 | Ape. Stop | Plano   |     | −0.238   |         |       |      |       |
| 2 | Lens 1    | 1.536   | ASP | 0.472    | Plastic | 1.535 | 55.7 | 2.79  |
| 3 |           | −45.582 | ASP | 0.091    |         |       |      |       |
| 4 | Lens 2    | 5.418   | ASP | 0.272    | Plastic | 1.650 | 21.5 | −4.78 |

TABLE 3-continued

2nd Embodiment
f = 4.09 mm, Fno = 2.45, HFOV = 34.5 deg.

| Surface # | | Curvature Radius | | Thickness | Material | Index | Abbe # | Focal Length |
|---|---|---|---|---|---|---|---|---|
| 5 | | 1.937 | ASP | 0.494 | | | | |
| 6 | Lens 3 | −5.845 | ASP | 0.735 | Plastic | 1.535 | 55.7 | −69.99 |
| 7 | | −7.229 | ASP | 0.389 | | | | |
| 8 | Lens 4 | 2.038 | ASP | 0.533 | Plastic | 1.544 | 55.9 | 3.85 |
| 9 | | 64.661 | ASP | 0.580 | | | | |
| 10 | Lens 5 | −2.049 | ASP | 0.407 | Plastic | 1.535 | 55.7 | −2.79 |
| 11 | | 5.909 | ASP | 0.300 | | | | |
| 12 | IR-cut filter | Plano | | 0.300 | Glass | 1.517 | 64.2 | — |
| 13 | | Plano | | 0.253 | | | | |
| 14 | Image | Plano | | — | | | | |

Note:
Reference wavelength is 587.6 nm (d-line).

TABLE 4

Aspheric Coefficients

| Surface # | 2 | 3 | 4 | 5 | 6 |
|---|---|---|---|---|---|
| k = | 2.4219E−01 | 1.6053E+01 | −8.9366E+01 | −1.1003E+00 | 3.1430E+01 |
| A4 = | −4.0584E−03 | −1.0599E−03 | 3.9092E−03 | −2.7519E−02 | −1.7439E−01 |
| A6 = | 9.7940E−03 | 3.8731E−02 | 6.3289E−02 | 1.4389E−01 | 3.2816E−01 |
| A8 = | −2.3033E−02 | −1.8513E−02 | −4.8515E−02 | −4.2240E−02 | −7.6088E−01 |
| A10 = | −4.5527E−03 | −9.7901E−02 | −6.4478E−02 | −6.0694E−02 | 7.9413E−01 |
| A12 = | 3.0554E−02 | 2.0572E−02 | −3.2852E−03 | 6.1950E−02 | 1.6416E−03 |
| A14 = | 6.5113E−03 | 1.0823E−01 | 9.4606E−02 | 9.8043E−02 | −7.0345E−01 |
| A16 = | −7.2153E−02 | −1.2996E−01 | −6.5448E−02 | −8.6420E−02 | 4.5073E−01 |

| Surface # | 7 | 8 | 9 | 10 | 11 |
|---|---|---|---|---|---|
| k = | 2.4024E+01 | −9.4973E+00 | −6.8733E+01 | −3.5517E−01 | 3.4082E+00 |
| A4 = | −3.1772E−01 | −6.0256E−02 | 3.0439E−02 | −3.9290E−02 | −9.8569E−02 |
| A6 = | 3.3840E−01 | −6.5562E−03 | −2.9661E−02 | 5.5357E−02 | 4.1557E−02 |
| A8 = | −4.8340E−01 | −1.0137E−02 | 4.5977E−03 | −2.2844E−02 | −1.6635E−02 |
| A10 = | 5.3936E−01 | 2.2765E−03 | 5.7859E−05 | 6.9548E−03 | 3.8184E−03 |
| A12 = | −4.0900E−01 | −5.1953E−05 | 1.4487E−05 | −1.3206E−03 | −4.4048E−04 |
| A14 = | 1.7717E−01 | −2.2317E−04 | 1.2982E−06 | 1.3445E−04 | 2.0145E−05 |
| A16 = | −3.2387E−02 | 6.3609E−05 | −2.1135E−06 | −5.4425E−06 | 1.7044E−07 |

In the 2nd embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 2nd embodiment, so an explanation in this regard will not be provided again.

Moreover, these parameters can be calculated from Table 3 and Table 4 as the following values and satisfy the following conditions:

| 2nd Embodiment | | | |
|---|---|---|---|
| f [mm] | 4.09 | R4/R3 | 0.36 |
| Fno | 2.45 | (R9 + R10)/(R9 − R10) | −0.49 |
| HFOV (deg.) | 34.5 | R7/f | 0.50 |
| V1/V3 | 1.00 | f4/R8 | 0.06 |
| CT3/CT1 | 1.56 | (f/R10) − (f/R9) | 2.69 |
| CT2/CT5 | 0.67 | f/f4 | 1.06 |
| T45/CT5 | 1.43 | |f4/f3| | 0.06 |
| Y41/CT4 | 1.77 | | |

Furthermore, in the image capturing optical lens assembly of the image capturing device according to the 2nd embodiment, an axial distance between the first lens element 210 and the second lens element 220 is T12, an axial distance between the second lens element 220 and the third lens element 230 is T23, an axial distance between the third lens element 230 and the fourth lens element 240 is T34, the axial distance between the fourth lens element 240 and the fifth lens element 250 is T45, and T45 is greater than T12, T23 and T34.

3rd Embodiment

Figure 5:
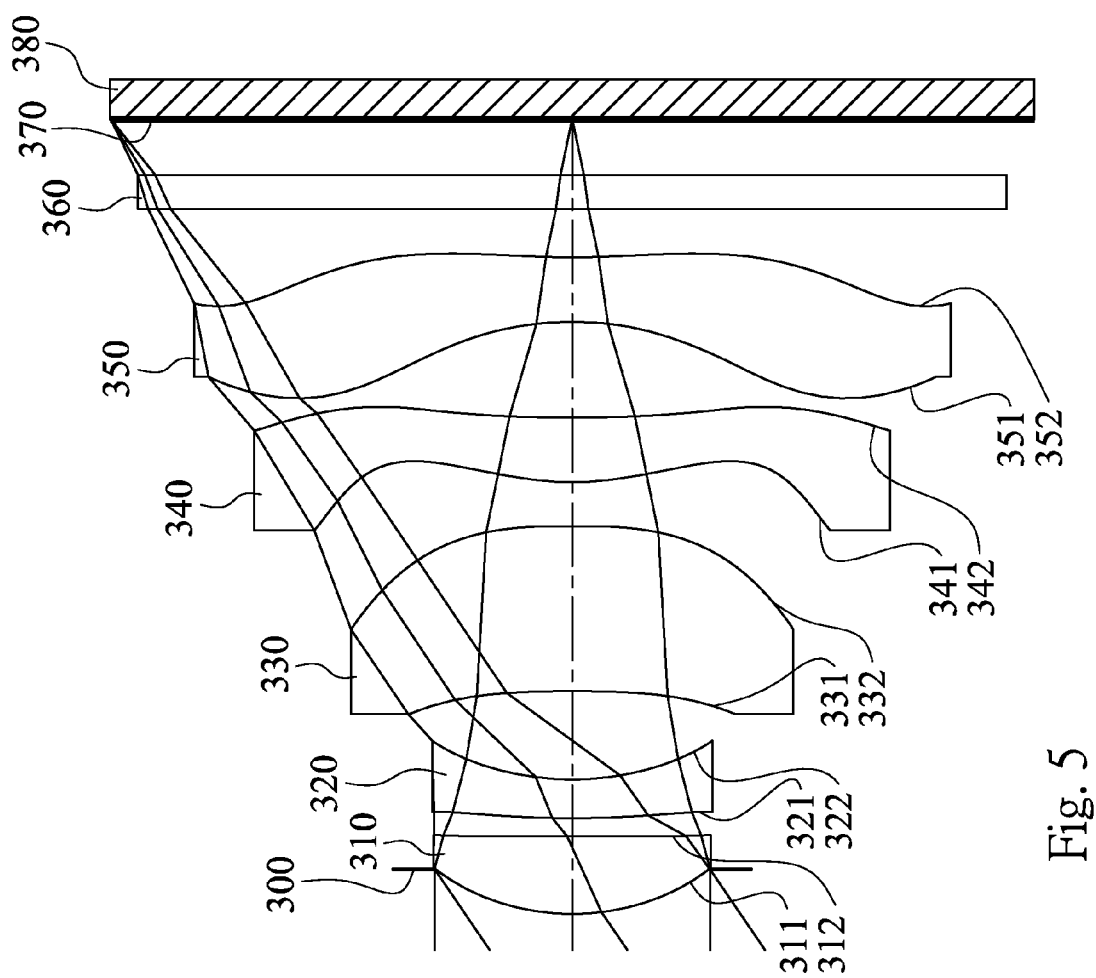
FIG. 5 is a schematic view of an image capturing device according to the 3rd embodiment of the present disclosure.
Figure 6:
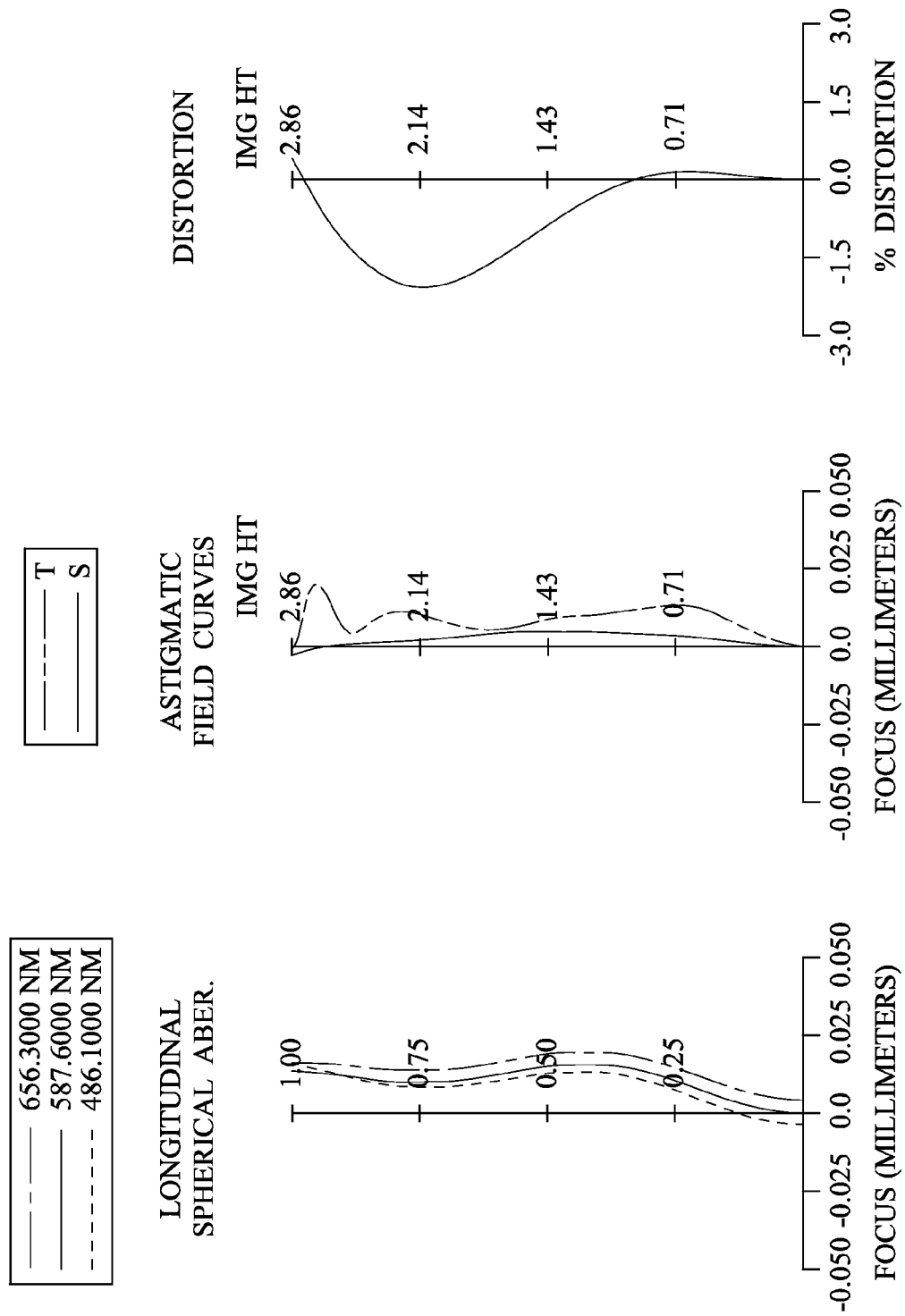
FIG. 6 shows spherical aberration curves, astigmatic field curves and a distortion curve of the image capturing device according to the 3rd embodiment.

FIG. 5 is a schematic view of an image capturing device according to the 3rd embodiment of the present disclosure. FIG. 6 shows, in order from left to right, spherical aberration curves, astigmatic field curves and a distortion curve of the image capturing device according to the 3rd embodiment.

In FIG. 5, the image capturing device includes the image capturing optical lens assembly (its reference numeral is omitted) of the present disclosure and an image sensor 380. The image capturing optical lens assembly includes, in order from an object side to an image side, an aperture stop 300, a first lens element 310, a second lens element 320, a third lens element 330, a fourth lens element 340, a fifth lens element 350, an IR-cut filter 360 and an image plane 370. The image sensor 380 is located on or near the image plane 370 of the image capturing optical lens assembly. The image capturing optical lens assembly has a total of five lens elements (310-350) with refractive power. Moreover, there is an air gap in a paraxial region between any two of the first lens element 310, the second lens element 320, the third lens element 330, the fourth lens element 340, and the fifth lens element 350 that are adjacent to each other.

The first lens element 310 with positive refractive power has an object-side surface 311 being convex in a paraxial region thereof and an image-side surface 312 being convex in a paraxial region thereof. The first lens element 310 is made of plastic material and has the object-side surface 311 and the image-side surface 312 being both aspheric. Furthermore, the image-side surface 312 of the first lens element 310 has at least one inflection point.

The second lens element 320 with negative refractive power has an object-side surface 321 being convex in a paraxial region thereof and an image-side surface 322 being concave in a paraxial region thereof. The second lens element 320 is made of plastic material and has the object-side surface 321 and the image-side surface 322 being both aspheric. Furthermore, the object-side surface 321 of the second lens element 320 has at least one inflection point.

The third lens element 330 with positive refractive power has an object-side surface 331 being concave in a paraxial region thereof and an image-side surface 332 being convex in a paraxial region thereof. The third lens element 330 is made of plastic material and has the object-side surface 331 and the image-side surface 332 being both aspheric. Furthermore, the object-side surface 331 of the third lens element 330 has at least one inflection point, and the image-side surface 332 of the third lens element 330 has at least one convex shape in an off-axial region thereon.

The fourth lens element 340 with positive refractive power has an object-side surface 341 being convex in a paraxial region thereof and an image-side surface 342 being concave in a paraxial region thereof. The fourth lens element 340 is made of plastic material and has the object-side surface 341 and the image-side surface 342 being both aspheric. Furthermore, both of the object-side surface 341 and the image-side surface 342 of the fourth lens element 340 have at least one inflection point.

The fifth lens element 350 with negative refractive power has an object-side surface 351 being concave in a paraxial region thereof and an image-side surface 352 being concave in a paraxial region thereof. The fifth lens element 350 is made of plastic material and has the object-side surface 351 and the image-side surface 352 being both aspheric. Furthermore, both of the object-side surface 351 and the image-side surface 352 of the fifth lens element 350 have at least one inflection point, and the image-side surface 352 of the fifth lens element 350 has at least one convex shape in an off-axial region thereon.

The IR-cut filter 360 is made of glass material and located between the fifth lens element 350 and the image plane 370, and will not affect a focal length of the image capturing optical lens assembly.

The detailed optical data of the 3rd embodiment are shown in Table 5 and the aspheric surface data are shown in Table 6 below.

TABLE 5

3rd Embodiment
f = 4.17 mm, Fno = 2.45, HFOV = 34.3 deg.

| Surface # | | Curvature Radius | Thickness | | Material | Index | Abbe # | Focal Length |
|---|---|---|---|---|---|---|---|---|
| 0 | Object | Plano | Infinity | | | | | |
| 1 | Ape. Stop | Plano | −0.277 | | | | | |
| 2 | Lens 1 | 1.495 | ASP | 0.481 | Plastic | 1.535 | 56.3 | 2.71 |
| 3 | | −43.564 | ASP | 0.110 | | | | |
| 4 | Lens 2 | 5.006 | ASP | 0.240 | Plastic | 1.632 | 23.4 | −4.15 |
| 5 | | 1.690 | ASP | 0.547 | | | | |
| 6 | Lens 3 | −8.663 | ASP | 1.021 | Plastic | 1.535 | 56.3 | 113.52 |
| 7 | | −7.893 | ASP | 0.272 | | | | |
| 8 | Lens 4 | 1.853 | ASP | 0.400 | Plastic | 1.544 | 55.8 | 3.83 |
| 9 | | 15.385 | ASP | 0.591 | | | | |
| 10 | Lens 5 | −2.071 | ASP | 0.400 | Plastic | 1.535 | 56.3 | −2.77 |
| 11 | | 5.573 | ASP | 0.300 | | | | |
| 12 | IR-cut filter | Plano | | 0.210 | Glass | 1.517 | 64.2 | — |
| 13 | | Plano | | 0.344 | | | | |
| 14 | Image | Plano | | — | | | | |

Note:
Reference wavelength is 587.6 nm (d-line).

TABLE 6

Aspheric Coefficients

| Surface # | 2 | 3 | 4 | 5 | 6 |
|---|---|---|---|---|---|
| k = | 3.1559E−01 | 9.0000E+01 | −9.0000E+01 | −2.1952E+00 | 2.8255E+01 |
| A4 = | 4.5787E−04 | 1.0870E−02 | −2.3916E−02 | −3.9144E−02 | −9.7931E−02 |
| A6 = | 1.1007E−02 | 5.2397E−02 | 7.1763E−02 | 1.9616E−01 | 1.4339E−01 |
| A8 = | −4.9525E−03 | −2.0126E−02 | −3.3714E−02 | −1.1029E−01 | −4.8213E−01 |
| A10 = | 1.1544E−02 | −7.5623E−02 | −1.2212E−01 | −3.8904E−02 | 9.1448E−01 |
| A12 = | −3.6632E−03 | 8.4265E−02 | −1.5590E−02 | 1.4312E−01 | −1.0105E+00 |
| A14 = | 3.7320E−02 | 5.7021E−02 | 3.3957E−01 | −4.4844E−02 | 5.9194E−01 |
| A16 = | −3.0663E−02 | −1.1318E−01 | −3.3263E−01 | −2.1569E−02 | −1.3350E−01 |

| Surface # | 7 | 8 | 9 | 10 | 11 |
|---|---|---|---|---|---|
| k = | 2.4024E+01 | −7.2128E+00 | 4.8697E+00 | −3.0778E−01 | 3.4082E+00 |
| A4 = | −2.9503E−01 | −6.6752E−02 | 6.5691E−02 | −5.6704E−02 | −1.0689E−01 |
| A6 = | 2.5350E−01 | 4.3259E−02 | −3.6210E−02 | 3.9936E−02 | 3.3711E−02 |

TABLE 6-continued

Aspheric Coefficients

| A8 = | −2.4208E−01 | −8.5244E−02 | −1.7648E−02 | 1.5561E−02 | −6.2726E−03 |
|---|---|---|---|---|---|
| A10 = | 1.7840E−01 | 5.2590E−02 | 1.5768E−02 | −1.3025E−02 | −9.6255E−04 |
| A12 = | −8.7256E−02 | −2.0285E−02 | −3.9948E−03 | 3.3856E−03 | 7.2812E−04 |
| A14 = | 2.3927E−02 | 4.4273E−03 | 3.7682E−04 | −4.0521E−04 | −1.2053E−04 |
| A16 = | −2.7445E−03 | −3.2802E−04 | −6.0520E−06 | 1.9181E−05 | 6.5071E−06 |

In the 3rd embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 3rd embodiment, so an explanation in this regard will not be provided again.

Moreover, these parameters can be calculated from Table 5 and Table 6 as the following values and satisfy the following conditions:

| 3rd Embodiment | | | |
|---|---|---|---|
| f [mm] | 4.17 | R4/R3 | 0.34 |
| Fno | 2.45 | (R9 + R10)/(R9 − R10) | −0.46 |
| HFOV (deg.) | 34.3 | R7/f | 0.44 |
| V1/V3 | 1.00 | f4/R8 | 0.25 |
| CT3/CT1 | 2.12 | (f/R10) − (f/R9) | 2.76 |
| CT2/CT5 | 0.60 | f/f4 | 1.09 |
| T45/CT5 | 1.48 | |f4/f3| | 0.03 |
| Y41/CT4 | 2.45 | | |

Furthermore, in the image capturing optical lens assembly of the image capturing device according to the 3rd embodiment, an axial distance between the first lens element 310 and the second lens element 320 is T12, an axial distance between the second lens element 320 and the third lens element 330 is T23, an axial distance between the third lens element 330 and the fourth lens element 340 is T34, the axial distance between the fourth lens element 340 and the fifth lens element 350 is T45, and T45 is greater than T12, T23 and T34.

4th Embodiment

Figure 7:
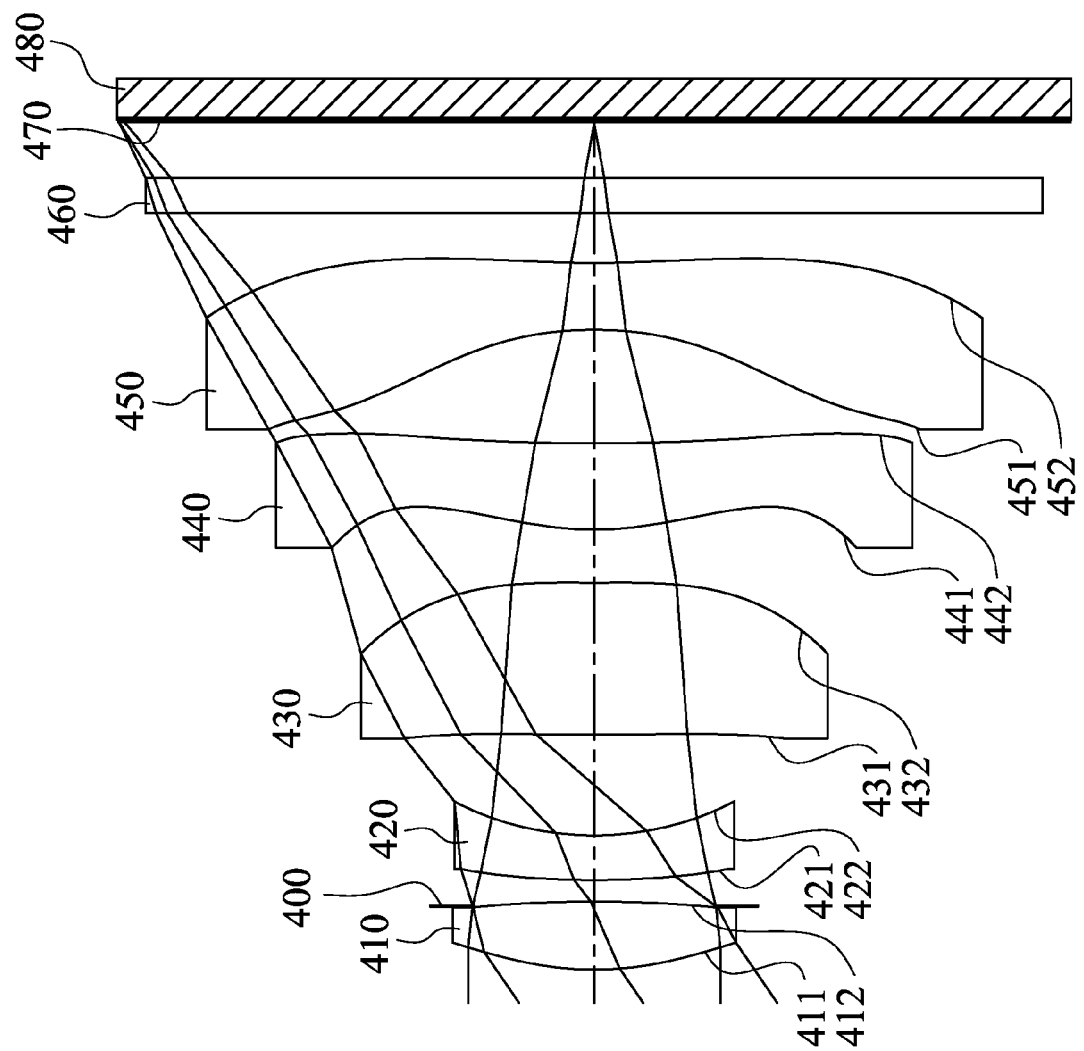
FIG. 7 is a schematic view of an image capturing device according to the 4th embodiment of the present disclosure.
Figure 8:
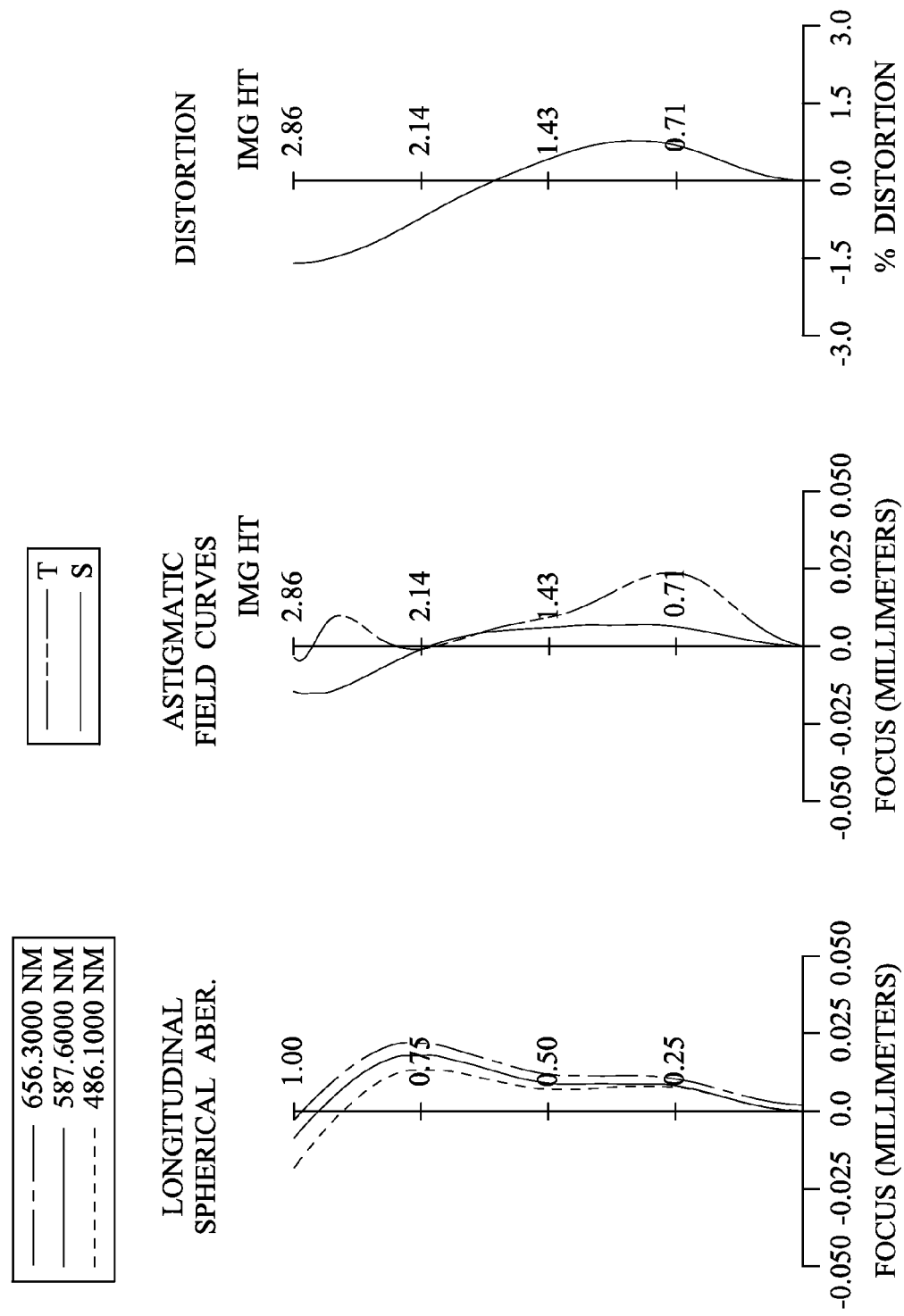
FIG. 8 shows spherical aberration curves, astigmatic field curves and a distortion curve of the image capturing device according to the 4th embodiment.

FIG. 7 is a schematic view of an image capturing device according to the 4th embodiment of the present disclosure. FIG. 8 shows, in order from left to right, spherical aberration curves, astigmatic field curves and a distortion curve of the image capturing device according to the 4th embodiment.

In FIG. 7, the image capturing device includes the image capturing optical lens assembly (its reference numeral is omitted) of the present disclosure and an image sensor 480. The image capturing optical lens assembly includes, in order from an object side to an image side, a first lens element 410, an aperture stop 400, a second lens element 420, a third lens element 430, a fourth lens element 440, a fifth lens element 450, an IR-cut filter 460 and an image plane 470. The image sensor 480 is located on or near the image plane 470 of the image capturing optical lens assembly. The image capturing optical lens assembly has a total of five lens elements (410-450) with refractive power. Moreover, there is an air gap in a paraxial region between any two of the first lens element 410, the second lens element 420, the third lens element 430, the fourth lens element 440, and the fifth lens element 450 that are adjacent to each other.

The first lens element 410 with positive refractive power has an object-side surface 411 being convex in a paraxial region thereof and an image-side surface 412 being convex in a paraxial region thereof. The first lens element 410 is made of plastic material and has the object-side surface 411 and the image-side surface 412 being both aspheric. Furthermore, the object-side surface 411 of the first lens element 410 has at least one inflection point.

The second lens element 420 with negative refractive power has an object-side surface 421 being convex in a paraxial region thereof and an image-side surface 422 being concave in a paraxial region thereof. The second lens element 420 is made of plastic material and has the object-side surface 421 and the image-side surface 422 being both aspheric.

The third lens element 430 with positive refractive power has an object-side surface 431 being convex in a paraxial region thereof and an image-side surface 432 being concave in a paraxial region thereof. The third lens element 430 is made of plastic material and has the object-side surface 431 and the image-side surface 432 being both aspheric. Furthermore, both of the object-side surface 431 and the image-side surface 432 of the third lens element 430 have at least one inflection point, the object-side surface 431 of the third lens element 430 has at least one concave shape in an off-axial region thereon, and the image-side surface 432 of the third lens element 430 has at least one convex shape in an off-axial region thereon.

The fourth lens element 440 with positive refractive power has an object-side surface 441 being convex in a paraxial region thereof and an image-side surface 442 being concave in a paraxial region thereof. The fourth lens element 440 is made of plastic material and has the object-side surface 441 and the image-side surface 442 being both aspheric. Furthermore, both of the object-side surface 441 and the image-side surface 442 of the fourth lens element 440 have at least one inflection point.

The fifth lens element 450 with negative refractive power has an object-side surface 451 being concave in a paraxial region thereof and an image-side surface 452 being concave in a paraxial region thereof. The fifth lens element 450 is made of plastic material and has the object-side surface 451 and the image-side surface 452 being both aspheric. Furthermore, both of the object-side surface 451 and the image-side surface 452 of the fifth lens element 450 have at least one inflection point, and the image-side surface 452 of the fifth lens element 450 has at least one convex shape in an off-axial region thereon.

The IR-cut filter 460 is made of glass material and located between the fifth lens element 450 and the image plane 470, and will not affect a focal length of the image capturing optical lens assembly.

The detailed optical data of the 4th embodiment are shown in Table 7 and the aspheric surface data are shown in Table 8 below.

TABLE 7

4th Embodiment
f = 4.23 mm, Fno = 2.80, HFOV = 34.4 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | 1.970 | ASP | 0.408 | Plastic | 1.535 | 55.7 | 2.99 |
| 2 | | −7.917 | ASP | −0.028 | | | | |
| 3 | Ape. Stop | Plano | | 0.157 | | | | |
| 4 | Lens 2 | 5.829 | ASP | 0.268 | Plastic | 1.639 | 23.5 | −4.32 |
| 5 | | 1.841 | ASP | 0.604 | | | | |
| 6 | Lens 3 | 19.079 | ASP | 0.911 | Plastic | 1.535 | 55.7 | 43.90 |
| 7 | | 100.000 | ASP | 0.318 | | | | |
| 8 | Lens 4 | 1.870 | ASP | 0.517 | Plastic | 1.544 | 55.9 | 4.05 |
| 9 | | 11.181 | ASP | 0.682 | | | | |
| 10 | Lens 5 | −2.316 | ASP | 0.400 | Plastic | 1.535 | 55.7 | −3.12 |
| 11 | | 6.330 | ASP | 0.300 | | | | |
| 12 | IR-cut filter | Plano | | 0.210 | Glass | 1.517 | 64.2 | — |
| 13 | | Plano | | 0.350 | | | | |
| 14 | Image | Plano | | — | | | | |

Note:
Reference wavelength is 587.6 nm (d-line).

TABLE 8

Aspheric Coefficients

| Surface # | 1 | 2 | 4 | 5 | 6 |
|---|---|---|---|---|---|
| k = | −8.8036E−01 | −1.0000E+00 | −1.0000E+00 | −1.8703E+00 | −1.0000E+00 |
| A4 = | −3.9461E−02 | −1.0272E−04 | 1.7401E−04 | −2.2607E−02 | −6.3433E−02 |
| A6 = | 1.8847E−01 | 4.0721E−03 | 7.3149E−02 | 3.2356E−01 | 9.5684E−02 |
| A8 = | −9.5734E−01 | −1.6204E−02 | −2.8126E−02 | −8.7171E−01 | −1.6429E−01 |
| A10 = | 2.6397E+00 | −3.2589E−02 | −7.6547E−02 | 1.2666E+00 | 1.8009E−01 |
| A12 = | −4.5347E+00 | −8.6781E−02 | 7.0522E−03 | −6.3955E−01 | −1.1619E−01 |
| A14 = | 4.2614E+00 | 1.2554E−01 | 2.0766E−01 | −3.3774E−01 | 3.8421E−02 |
| A16 = | −1.6800E+00 | 4.7984E−03 | −1.5045E−01 | 3.4746E−01 | −4.9738E−03 |

| Surface # | 7 | 8 | 9 | 10 | 11 |
|---|---|---|---|---|---|
| k = | 3.4676E+01 | −7.0979E+00 | 1.1848E+00 | −2.8998E−01 | 2.8115E+00 |
| A4 = | −2.4297E−01 | −8.4941E−02 | −3.5222E−02 | −1.0963E−01 | −7.7446E−02 |
| A6 = | 1.9838E−01 | 6.4145E−02 | 6.7277E−02 | 1.2163E−01 | 3.3071E−02 |
| A8 = | −1.8047E−01 | −6.9481E−02 | −5.9965E−02 | −5.6843E−02 | −1.0536E−02 |
| A10 = | 1.2512E−01 | 3.3023E−02 | 2.6816E−02 | 2.0594E−02 | 1.8782E−03 |
| A12 = | −5.6676E−02 | −9.5482E−03 | −6.7055E−03 | −5.5711E−03 | −1.7444E−04 |
| A14 = | 1.4661E−02 | 1.6981E−03 | 9.1946E−04 | 9.0996E−04 | 6.8907E−06 |
| A16 = | −1.6989E−03 | −1.3756E−04 | −5.6341E−05 | −6.5040E−05 | −5.9411E−08 |

In the 4th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 4th embodiment, so an explanation in this regard will not be provided again.

Moreover, these parameters can be calculated from Table 7 and Table 8 as the following values and satisfy the following conditions:

| 4th Embodiment | | | |
|---|---|---|---|
| f [mm] | 4.23 | R4/R3 | 0.32 |
| Fno | 2.80 | (R9 + R10)/(R9 − R10) | −0.46 |
| HFOV (deg.) | 34.4 | R7/f | 0.44 |
| V1/V3 | 1.00 | f4/R8 | 0.36 |
| CT3/CT1 | 2.23 | (f/R10) − (f/R9) | 2.49 |
| CT2/CT5 | 0.67 | f/f4 | 1.04 |
| T45/CT5 | 1.71 | |f4/f3| | 0.09 |
| Y41/CT4 | 2.03 | | |

Furthermore, in the image capturing optical lens assembly of the image capturing device according to the 4th embodiment, an axial distance between the first lens element 410 and the second lens element 420 is T12, an axial distance between the second lens element 420 and the third lens element 430 is T23, an axial distance between the third lens element 430 and the fourth lens element 440 is T34, the axial distance between the fourth lens element 440 and the fifth lens element 450 is T45, and T45 is greater than T12, T23 and T34.

5th Embodiment

Figure 9:
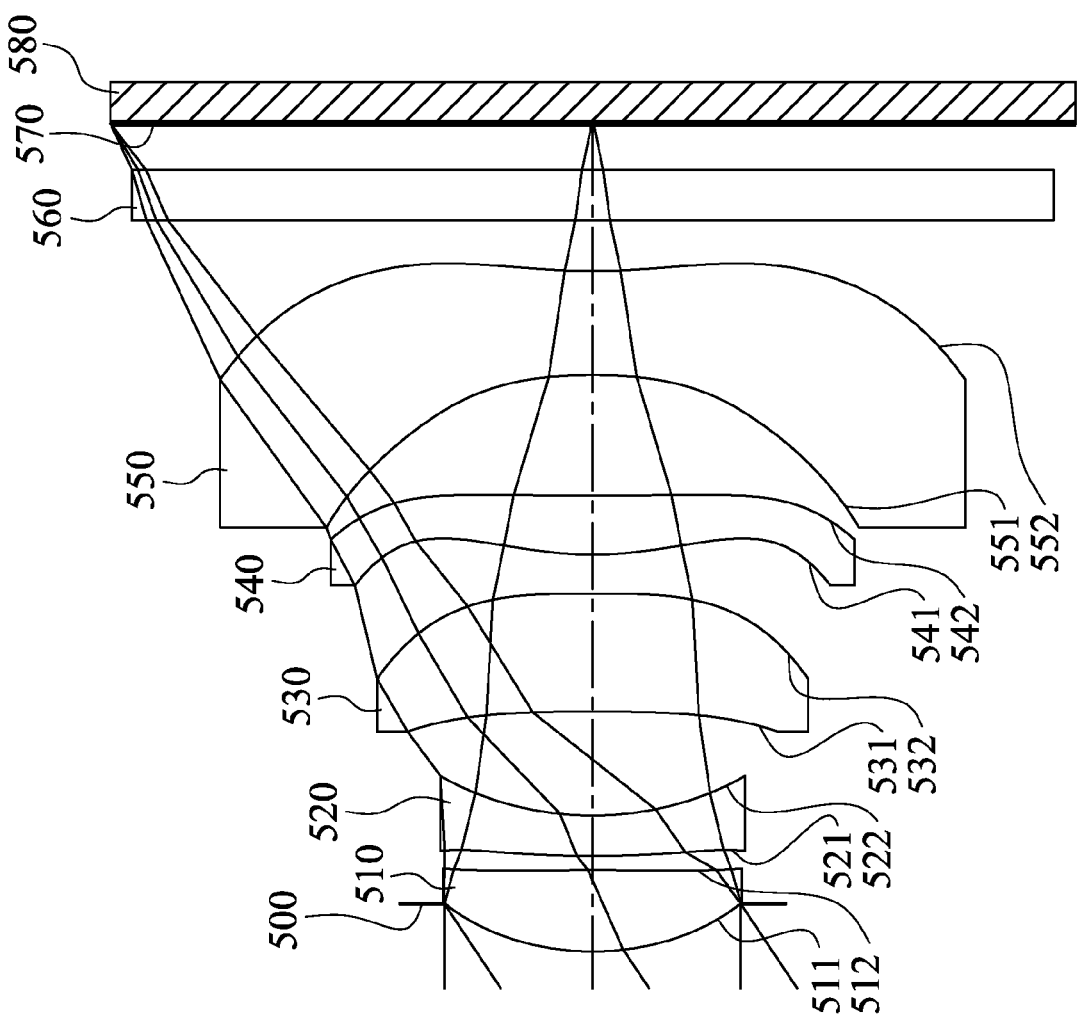
FIG. 9 is a schematic view of an image capturing device according to the 5th embodiment of the present disclosure.
Figure 10:
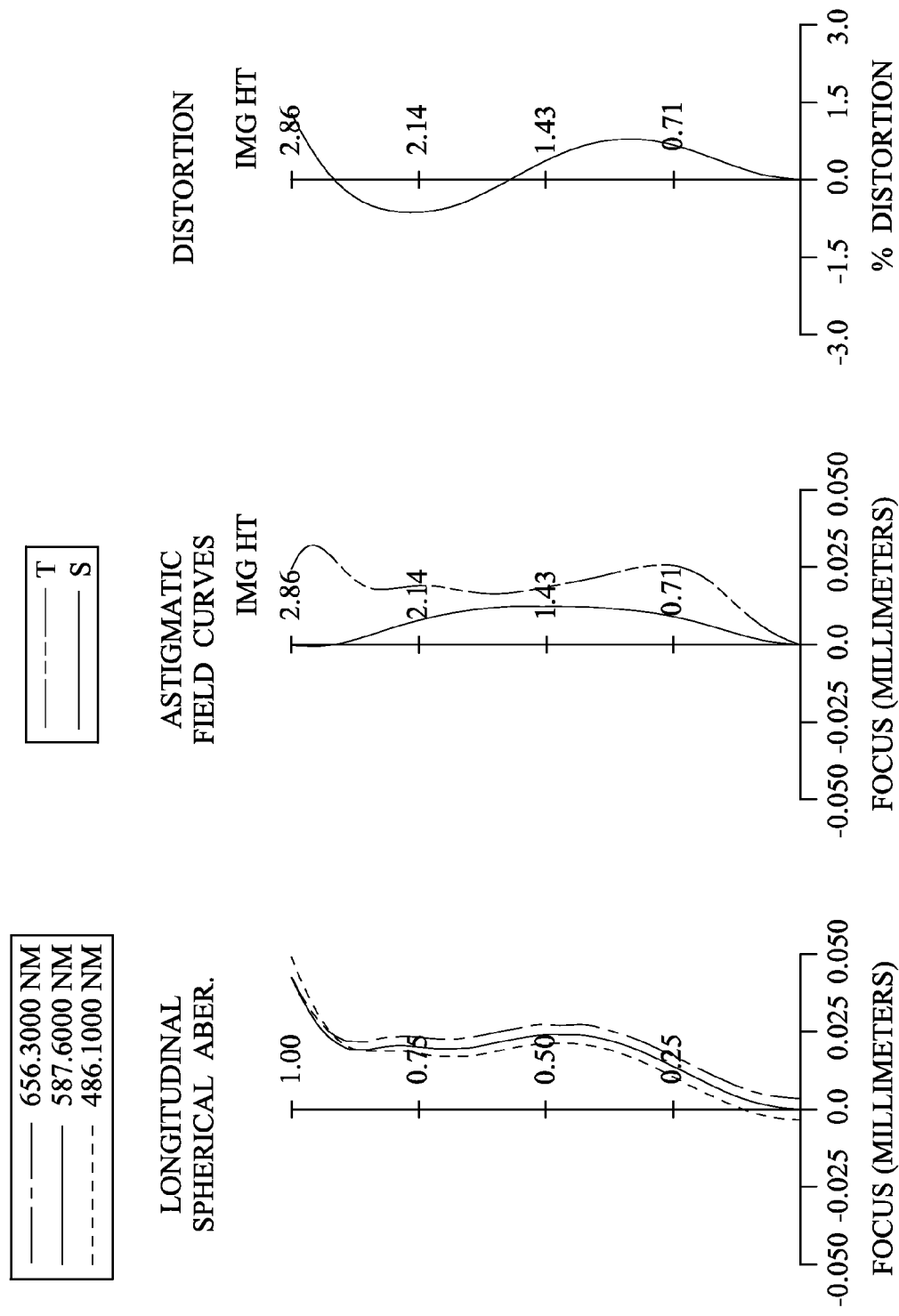
FIG. 10 shows spherical aberration curves, astigmatic field curves and a distortion curve of the image capturing device according to the 5th embodiment.

FIG. 9 is a schematic view of an image capturing device according to the 5th embodiment of the present disclosure. FIG. 10 shows, in order from left to right, spherical aberration curves, astigmatic field curves and a distortion curve of the image capturing device according to the 5th embodiment.

In FIG. 9, the image capturing device includes the image capturing optical lens assembly (its reference numeral is omitted) of the present disclosure and an image sensor 580. The image capturing optical lens assembly includes, in order from an object side to an image side, an aperture stop 500, a first lens element 510, a second lens element 520, a third lens element 530, a fourth lens element 540, a fifth lens element 550, an IR-cut filter 560 and an image plane 570. The image sensor 580 is located on or near the image plane 570 of the image capturing optical lens assembly. The image capturing optical lens assembly has a total of five lens elements (510-550) with refractive power. Moreover, there is an air gap in a paraxial region between any two of the first lens element 510, the second lens element 520, the third lens element 530, the fourth lens element 540, and the fifth lens element 550 that are adjacent to each other.

The first lens element 510 with positive refractive power has an object-side surface 511 being convex in a paraxial region thereof and an image-side surface 512 being convex in a paraxial region thereof. The first lens element 510 is made of plastic material and has the object-side surface 511 and the image-side surface 512 being both aspheric. Furthermore, the image-side surface 512 of the first lens element 510 has at least one inflection point.

The second lens element 520 with negative refractive power has an object-side surface 521 being convex in a paraxial region thereof and an image-side surface 522 being concave in a paraxial region thereof. The second lens element 520 is made of plastic material and has the object-side surface 521 and the image-side surface 522 being both aspheric. Furthermore, the object-side surface 521 of the second lens element 520 has at least one inflection point.

The third lens element 530 with negative refractive power has an object-side surface 531 being concave in a paraxial region thereof and an image-side surface 532 being convex in a paraxial region thereof. The third lens element 530 is made of plastic material and has the object-side surface 531 and the image-side surface 532 being both aspheric. Furthermore, the object-side surface 531 of the third lens element 530 has at least one concave shape in an off-axial region thereon, and the image-side surface 532 of the third lens element 530 has at least one convex shape in an off-axial region thereon.

The fourth lens element 540 with positive refractive power has an object-side surface 541 being convex in a paraxial region thereof and an image-side surface 542 being concave in a paraxial region thereof. The fourth lens element 540 is made of plastic material and has the object-side surface 541 and the image-side surface 542 being both aspheric. Furthermore, both of the object-side surface 541 and the image-side surface 542 of the fourth lens element 540 have at least one inflection point.

The fifth lens element 550 with negative refractive power has an object-side surface 551 being concave in a paraxial region thereof and an image-side surface 552 being concave in a paraxial region thereof. The fifth lens element 550 is made of plastic material and has the object-side surface 551 and the image-side surface 552 being both aspheric. Furthermore, the image-side surface 552 of the fifth lens element 550 has at least one inflection point, and the image-side surface 552 of the fifth lens element 550 has at least one convex shape in an off-axial region thereon.

The IR-cut filter 560 is made of glass material and located between the fifth lens element 550 and the image plane 570, and will not affect a focal length of the image capturing optical lens assembly.

The detailed optical data of the 5th embodiment are shown in Table 9 and the aspheric surface data are shown in Table 10 below.

TABLE 9

5th Embodiment
f = 4.21 mm, Fno = 2.40, HFOV = 33.7 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.282 | | | | |
| 2 | Lens 1 | 1.593 | ASP | 0.483 | Plastic | 1.535 | 55.7 | 2.79 |
| 3 | | −21.698 | ASP | 0.082 | | | | |
| 4 | Lens 2 | 5.570 | ASP | 0.240 | Plastic | 1.639 | 23.5 | −4.32 |
| 5 | | 1.814 | ASP | 0.617 | | | | |
| 6 | Lens 3 | −16.310 | ASP | 0.698 | Plastic | 1.544 | 55.9 | −65.99 |
| 7 | | −30.335 | ASP | 0.231 | | | | |
| 8 | Lens 4 | 2.062 | ASP | 0.350 | Plastic | 1.544 | 55.9 | 3.86 |
| 9 | | 98.901 | ASP | 0.714 | | | | |
| 10 | Lens 5 | −3.081 | ASP | 0.616 | Plastic | 1.535 | 55.7 | −2.94 |
| 11 | | 3.434 | ASP | 0.300 | | | | |
| 12 | IR-cut filter | Plano | | 0.300 | Glass | 1.517 | 64.2 | — |
| 13 | | Plano | | 0.275 | | | | |
| 14 | Image | Plano | | — | | | | |

Note:
Reference wavelength is 587.6 nm (d-line).

TABLE 10

Aspheric Coefficients

| Surface # | 2 | 3 | 4 | 5 | 6 |
|---|---|---|---|---|---|
| k = | 3.6554E−01 | −4.3344E+01 | −8.5036E+01 | −1.3498E+00 | 7.7507E+01 |
| A4 = | 2.7377E−04 | 3.3991E−02 | −6.2642E−03 | −3.2173E−02 | −8.0734E−02 |
| A6 = | 1.2040E−02 | 2.7196E−02 | 4.8463E−02 | 1.2106E−01 | 1.0277E−01 |
| A8 = | 6.5093E−03 | −4.9366E−03 | −4.9252E−02 | −4.9658E−02 | −2.0825E−01 |
| A10 = | 8.5822E−03 | −1.0136E−04 | −8.4393E−02 | −5.2850E−02 | 2.5731E−01 |
| A12 = | −1.5481E−03 | −2.3831E−02 | 1.5421E−03 | 4.8363E−02 | −1.9442E−01 |
| A14 = | 2.4296E−02 | 2.1903E−02 | 1.5125E−01 | −2.6032E−02 | 8.1829E−02 |
| A16 = | −7.8472E−03 | −2.1618E−02 | −1.7039E−01 | 2.8404E−02 | −1.3904E−02 |

TABLE 10-continued

Aspheric Coefficients

| Surface # | 7 | 8 | 9 | 10 | 11 |
|---|---|---|---|---|---|
| k = | 4.5828E+01 | −7.2012E+00 | 7.4318E+01 | 1.0691E+00 | 1.0587E+00 |
| A4 = | −2.8169E−01 | −8.3361E−02 | 2.9238E−02 | −1.8760E−01 | −1.6017E−01 |
| A6 = | 1.4147E−01 | −2.4127E−03 | −6.4703E−02 | 9.7169E−02 | 7.1968E−02 |
| A8 = | −3.8102E−02 | −1.4841E−02 | 2.9858E−02 | −5.2989E−02 | −3.2294E−02 |
| A10 = | −7.0472E−02 | 7.0442E−04 | −1.3055E−02 | 4.7901E−02 | 1.0365E−02 |
| A12 = | 9.1222E−02 | 3.8155E−05 | 3.1095E−03 | −2.6773E−02 | −2.1376E−03 |
| A14 = | −4.5963E−02 | −1.9074E−04 | −1.0245E−04 | 6.8168E−03 | 2.4293E−04 |
| A16 = | 8.6262E−03 | 2.8884E−04 | −3.9332E−05 | −6.5986E−04 | −1.1617E−05 |

In the 5th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 5th embodiment, so an explanation in this regard will not be provided again.

Moreover, these parameters can be calculated from Table 9 and Table 10 as the following values and satisfy the following conditions:

| 5th Embodiment | | | |
|---|---|---|---|
| f [mm] | 4.21 | R4/R3 | 0.33 |
| Fno | 2.40 | (R9 + R10)/(R9 − R10) | −0.05 |
| HFOV (deg.) | 33.7 | R7/f | 0.49 |
| V1/V3 | 1.00 | f4/R8 | 0.04 |
| CT3/CT1 | 1.45 | (f/R10) − (f/R9) | 2.59 |
| CT2/CT5 | 0.39 | f/f4 | 1.09 |
| T45/CT5 | 1.16 | |f4/f3| | 0.06 |
| Y41/CT4 | 2.55 | | |

Furthermore, in the image capturing optical lens assembly of the image capturing device according to the 5th embodiment, an axial distance between the first lens element 510 and the second lens element 520 is T12, an axial distance between the second lens element 520 and the third lens element 530 is T23, an axial distance between the third lens element 530 and the fourth lens element 540 is T34, the axial distance between the fourth lens element 540 and the fifth lens element 550 is T45, and T45 is greater than T12, T23 and T34.

6th Embodiment

Figure 11:
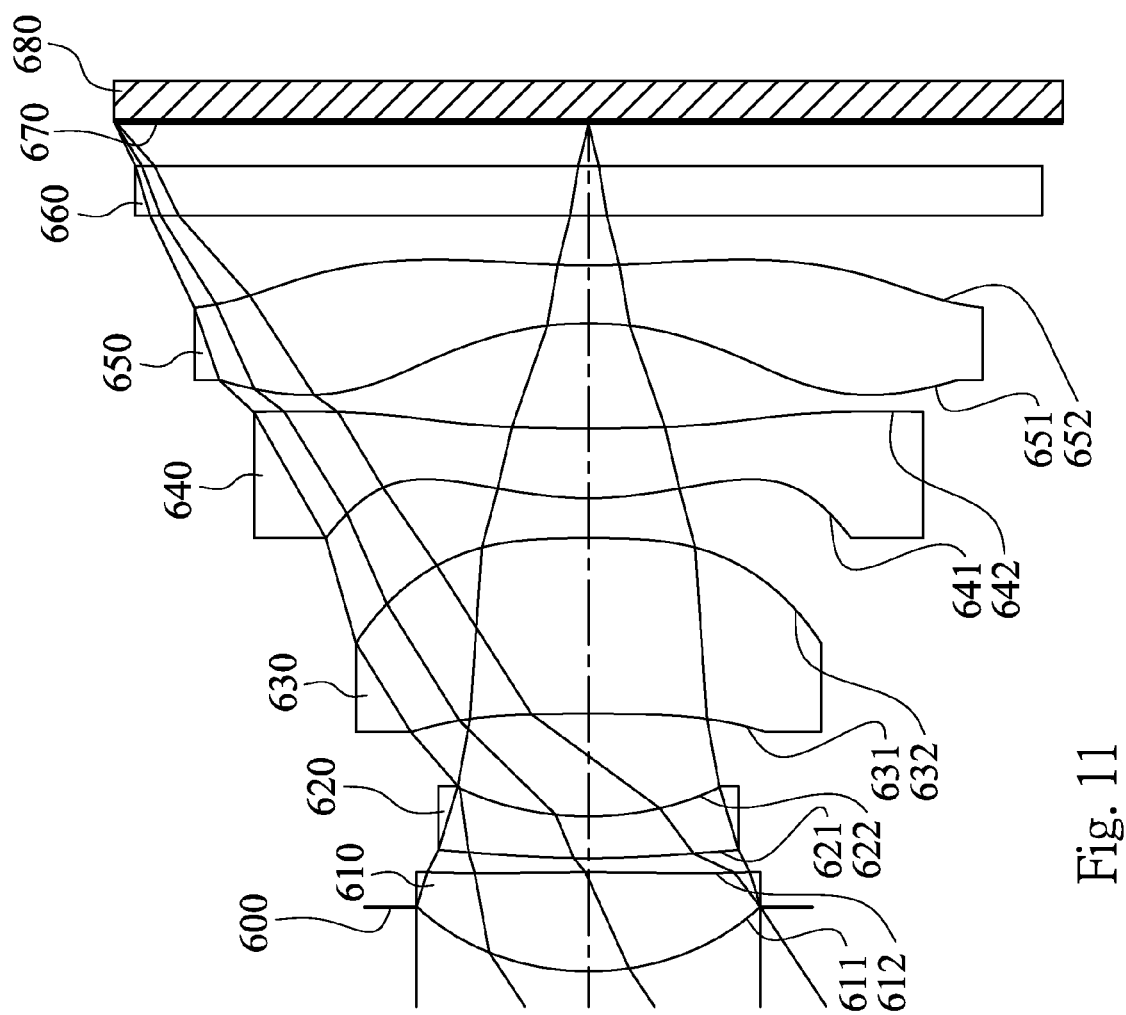
FIG. 11 is a schematic view of an image capturing device according to the 6th embodiment of the present disclosure.
Figure 12:
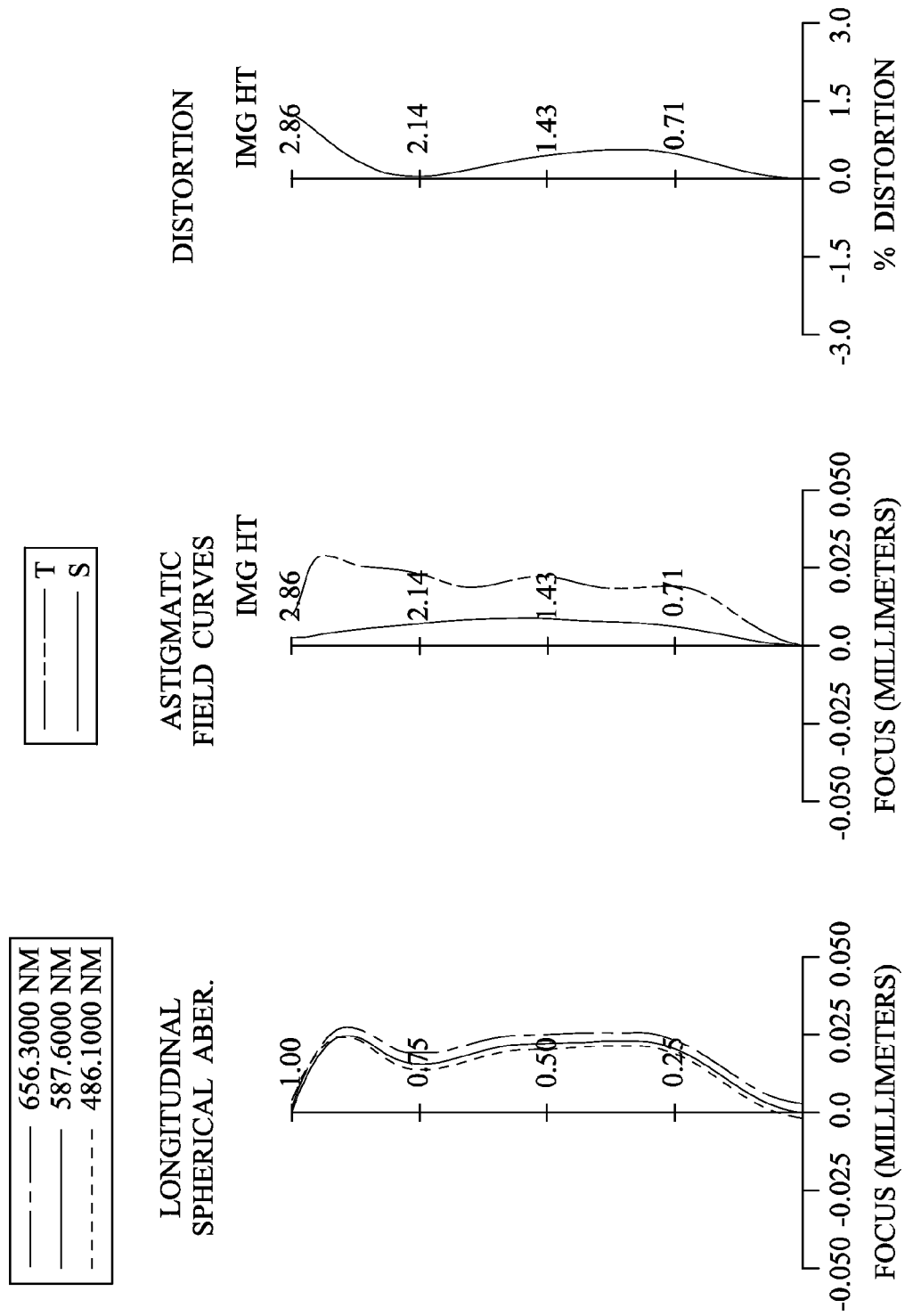
FIG. 12 shows spherical aberration curves, astigmatic field curves and a distortion curve of the image capturing device according to the 6th embodiment.

FIG. 11 is a schematic view of an image capturing device according to the 6th embodiment of the present disclosure. FIG. 12 shows, in order from left to right, spherical aberration curves, astigmatic field curves and a distortion curve of the image capturing device according to the 6th embodiment.

In FIG. 11, the image capturing device includes the image capturing optical lens assembly (its reference numeral is omitted) of the present disclosure and an image sensor 680. The image capturing optical lens assembly includes, in order from an object side to an image side, an aperture stop 600, a first lens element 610, a second lens element 620, a third lens element 630, a fourth lens element 640, a fifth lens element 650, an IR-cut filter 660 and an image plane 670. The image sensor 680 is located on or near the image plane 670 of the image capturing optical lens assembly. The image capturing optical lens assembly has a total of five lens elements (610-650) with refractive power. Moreover, there is an air gap in a paraxial region between any two of the first lens element 610, the second lens element 620, the third lens element 630, the fourth lens element 640, and the fifth lens element 650 that are adjacent to each other.

The first lens element 610 with positive refractive power has an object-side surface 611 being convex in a paraxial region thereof and an image-side surface 612 being convex in a paraxial region thereof. The first lens element 610 is made of plastic material and has the object-side surface 611 and the image-side surface 612 being both aspheric. Furthermore, the image-side surface 612 of the first lens element 610 has at least one inflection point.

The second lens element 620 with negative refractive power has an object-side surface 621 being convex in a paraxial region thereof and an image-side surface 622 being concave in a paraxial region thereof. The second lens element 620 is made of plastic material and has the object-side surface 621 and the image-side surface 622 being both aspheric. Furthermore, the object-side surface 621 of the second lens element 620 has at least one inflection point.

The third lens element 630 with positive refractive power has an object-side surface 631 being concave in a paraxial region thereof and an image-side surface 632 being convex in a paraxial region thereof. The third lens element 630 is made of plastic material and has the object-side surface 631 and the image-side surface 632 being both aspheric. Furthermore, the object-side surface 631 of the third lens element 630 has at least one concave shape in an off-axial region thereon, and the image-side surface 632 of the third lens element 630 has at least one convex shape in an off-axial region thereon.

The fourth lens element 640 with positive refractive power has an object-side surface 641 being convex in a paraxial region thereof and an image-side surface 642 being concave in a paraxial region thereof. The fourth lens element 640 is made of plastic material and has the object-side surface 641 and the image-side surface 642 being both aspheric. Furthermore, both of the object-side surface 641 and the image-side surface 642 of the fourth lens element 640 have at least one inflection point.

The fifth lens element 650 with negative refractive power has an object-side surface 651 being concave in a paraxial region thereof and an image-side surface 652 being concave in a paraxial region thereof. The fifth lens element 650 is made of plastic material and has the object-side surface 651 and the image-side surface 652 being both aspheric. Furthermore, both of the object-side surface 651 and the image-side surface 652 of the fifth lens element 650 have at least one inflection point, and the image-side surface 652 of the fifth lens element 650 has at least one convex shape in an off-axial region thereon.

The IR-cut filter 660 is made of glass material and located between the fifth lens element 650 and the image plane 670, and will not affect a focal length of the image capturing optical lens assembly.

The detailed optical data of the 6th embodiment are shown in Table 11 and the aspheric surface data are shown in Table 12 below.

TABLE 11

6th Embodiment
f = 4.24 mm, Fno = 2.05, HFOV = 33.5 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.388 | | | | |
| 2 | Lens 1 | 1.639 | ASP | 0.598 | Plastic | 1.544 | 55.9 | 2.79 |
| 3 | | −18.301 | ASP | 0.085 | | | | |
| 4 | Lens 2 | 5.992 | ASP | 0.251 | Plastic | 1.640 | 23.3 | −4.14 |
| 5 | | 1.807 | ASP | 0.620 | | | | |
| 6 | Lens 3 | −16.013 | ASP | 1.058 | Plastic | 1.544 | 55.9 | 33.49 |
| 7 | | −8.721 | ASP | 0.240 | | | | |
| 8 | Lens 4 | 2.115 | ASP | 0.421 | Plastic | 1.544 | 55.9 | 4.22 |
| 9 | | 25.000 | ASP | 0.632 | | | | |
| 10 | Lens 5 | −2.259 | ASP | 0.350 | Plastic | 1.535 | 55.7 | −2.84 |
| 11 | | 4.897 | ASP | 0.300 | | | | |
| 12 | IR-cut filter | Plano | | 0.300 | Glass | 1.517 | 64.2 | — |
| 13 | | Plano | | 0.266 | | | | |
| 14 | Image | Plano | | — | | | | |

Note 1:
Reference wavelength is 587.6 nm (d-line).
Note 2:
Effective radius of Surface 7 is 1.400 mm.

TABLE 12

Aspheric Coefficients

| Surface # | 2 | 3 | 4 | 5 | 6 |
|---|---|---|---|---|---|
| k = | 2.6436E−01 | 1.3743E−02 | −1.0000E+00 | −1.7760E+00 | 2.7613E+01 |
| A4 = | −9.7662E−03 | 3.0763E−02 | −6.4787E−02 | −3.4345E−02 | −6.9612E−02 |
| A6 = | 8.1544E−02 | −1.3040E−02 | 9.3901E−02 | 1.3652E−01 | 8.2640E−02 |
| A8 = | −3.2013E−01 | 8.4236E−02 | −1.9116E−01 | −6.9380E−02 | −2.5158E−01 |
| A10 = | 7.1807E−01 | −1.1890E−01 | −9.5020E−02 | −2.3388E−02 | 4.1579E−01 |
| A12 = | −8.8369E−01 | −2.1946E−02 | −1.9550E−02 | 8.7259E−02 | −4.0597E−01 |
| A14 = | 5.6974E−01 | 1.5519E−01 | 1.9113E−01 | −1.9301E−02 | 2.1110E−01 |
| A16 = | −1.4886E−01 | −8.8257E−02 | −1.2617E−01 | −1.9914E−02 | −4.1689E−02 |

| Surface # | 7 | 8 | 9 | 10 | 11 |
|---|---|---|---|---|---|
| k = | 1.7358E+01 | −8.6666E+00 | 1.8227E+01 | −2.3084E−01 | 2.5395E+00 |
| A4 = | −2.4972E−01 | −6.3616E−02 | 6.7931E−02 | −6.3672E−02 | −1.0223E−01 |
| A6 = | 1.7834E−01 | 4.7688E−02 | −2.2074E−02 | 5.3470E−02 | 3.9647E−02 |
| A8 = | −1.4490E−01 | −9.1114E−02 | −2.3522E−02 | 3.1224E−03 | −1.0689E−02 |
| A10 = | 8.7724E−02 | 6.4138E−02 | 1.9045E−02 | −7.7847E−03 | 9.8763E−04 |
| A12 = | −3.3969E−02 | −2.8848E−02 | −5.6770E−03 | 2.1868E−03 | 1.5526E−04 |
| A14 = | 6.5146E−03 | 7.6530E−03 | 7.8610E−04 | −2.6193E−04 | −3.7033E−05 |
| A16 = | −3.7870E−04 | −8.3801E−04 | −4.2205E−05 | 1.2088E−05 | 1.9256E−06 |

In the 6th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 6th embodiment, so an explanation in this regard will not be provided again.

Moreover, these parameters can be calculated from Table 11 and Table 12 as the following values and satisfy the following conditions:

| 6th Embodiment | | | |
|---|---|---|---|
| f [mm] | 4.24 | R4/R3 | 0.30 |
| Fno | 2.05 | (R9 + R10)/(R9 − R10) | −0.37 |
| HFOV (deg.) | 33.5 | R7/f | 0.50 |
| V1/V3 | 1.00 | f4/R8 | 0.17 |
| CT3/CT1 | 1.77 | (f/R10) − (f/R9) | 2.74 |
| CT2/CT5 | 0.72 | f/f4 | 1.00 |

-continued

| 6th Embodiment | | | |
|---|---|---|---|
| T45/CT5 | 1.81 | |f4/f3| | 0.13 |
| Y41/CT4 | 2.33 | | |

Furthermore, in the image capturing optical lens assembly of the image capturing device according to the 6th embodiment, an axial distance between the first lens element 610 and the second lens element 620 is T12, an axial distance between the second lens element 620 and the third lens element 630 is T23, an axial distance between the third lens element 630 and the fourth lens element 640 is T34, the axial distance between the fourth lens element 640 and the fifth lens element 650 is T45, and T45 is greater than T12, T23 and T34.

7th Embodiment

Figure 13:
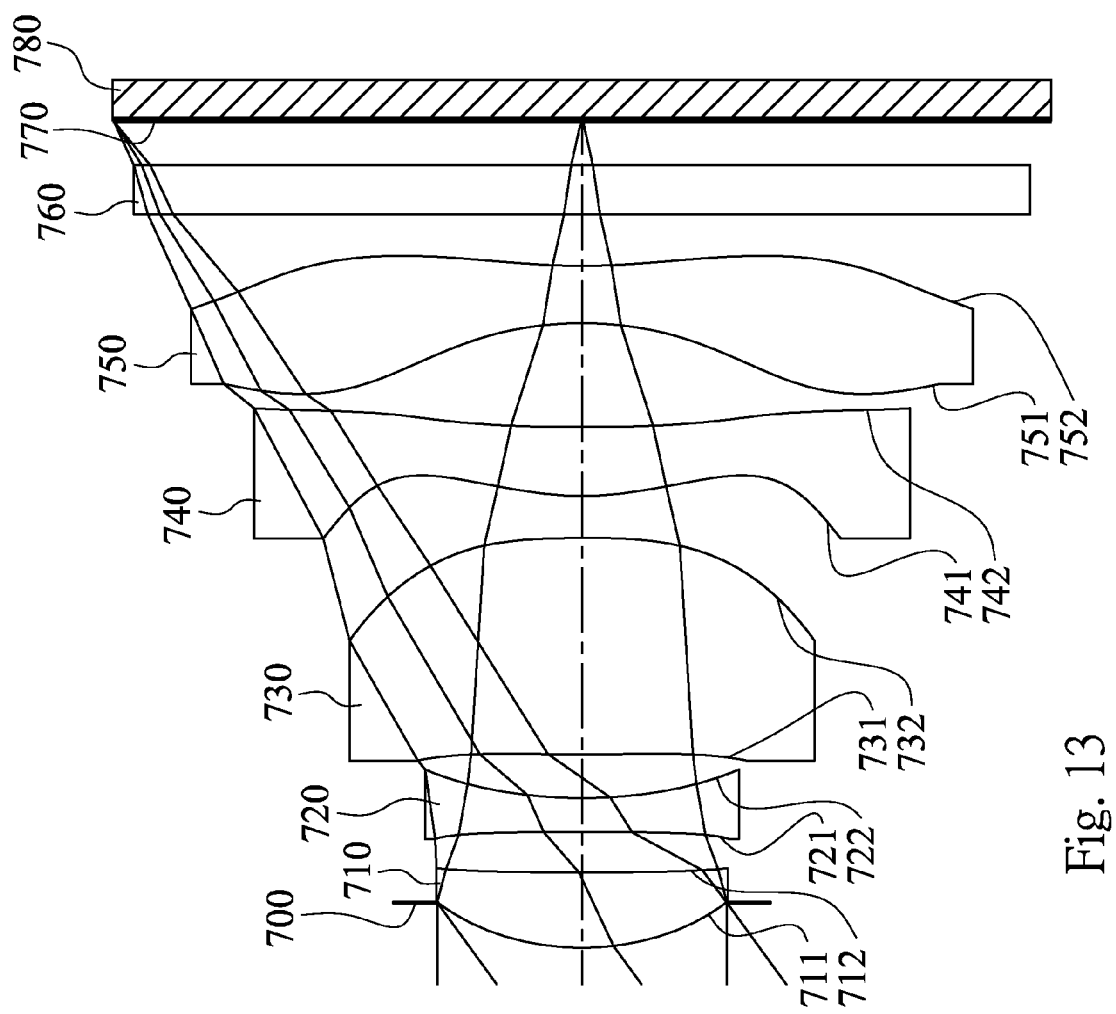
FIG. 13 is a schematic view of an image capturing device according to the 7th embodiment of the present disclosure.

FIG. 13 is a schematic view of an image capturing device according to the 7th embodiment of the present disclosure.

Figure 14:
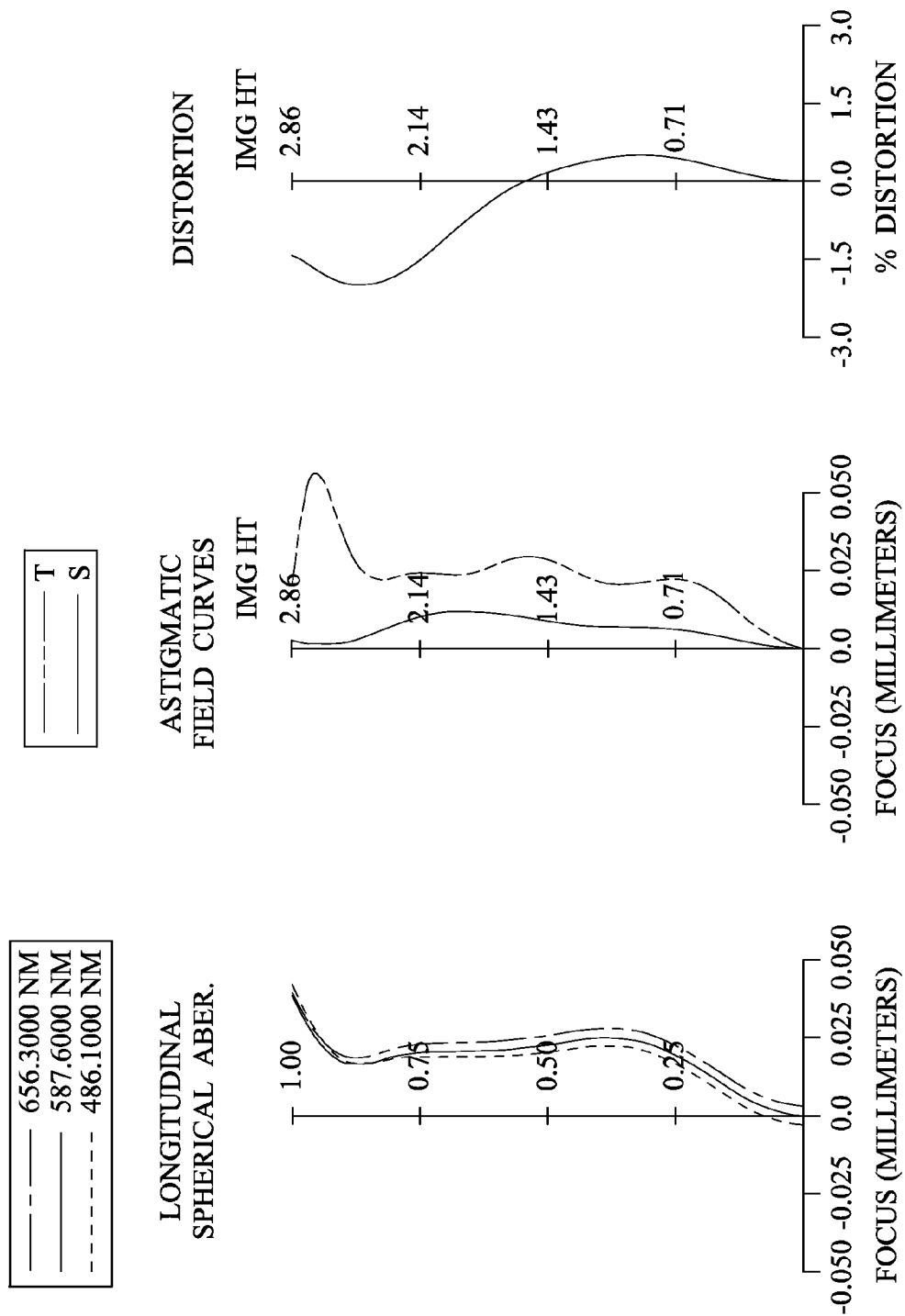
FIG. 14 shows spherical aberration curves, astigmatic field curves and a distortion curve of the image capturing device according to the 7th embodiment.

FIG. 14 shows, in order from left to right, spherical aberration curves, astigmatic field curves and a distortion curve of the image capturing device according to the 7th embodiment.

In FIG. 13, the image capturing device includes the image capturing optical lens assembly (its reference numeral is omitted) of the present disclosure and an image sensor 780. The image capturing optical lens assembly includes, in order from an object side to an image side, an aperture stop 700, a first lens element 710, a second lens element 720, a third lens element 730, a fourth lens element 740, a fifth lens element 750, an IR-cut filter 760 and an image plane 770. The image sensor 780 is located on or near the image plane 770 of the image capturing optical lens assembly. The image capturing optical lens assembly has a total of five lens elements (710-750) with refractive power. Moreover, there is an air gap in a paraxial region between any two of the first lens element 710, the second lens element 720, the third lens element 730, the fourth lens element 740, and the fifth lens element 750 that are adjacent to each other.

The first lens element 710 with positive refractive power has an object-side surface 711 being convex in a paraxial region thereof and an image-side surface 712 being concave in a paraxial region thereof. The first lens element 710 is made of plastic material and has the object-side surface 711 and the image-side surface 712 being both aspheric.

The second lens element 720 with negative refractive power has an object-side surface 721 being concave in a paraxial region thereof and an image-side surface 722 being concave in a paraxial region thereof. The second lens element 720 is made of plastic material and has the object-side surface 721 and the image-side surface 722 being both aspheric.

The third lens element 730 with positive refractive power has an object-side surface 731 being convex in a paraxial region thereof and an image-side surface 732 being convex in a paraxial region thereof. The third lens element 730 is made of plastic material and has the object-side surface 731 and the image-side surface 732 being both aspheric. Furthermore, the object-side surface 731 of the third lens element 730 has at least one inflection point, the object-side surface 731 of the third lens element 730 has at least one concave shape in an off-axial region thereon, and the image-side surface 732 of the third lens element 730 has at least one convex shape in an off-axial region thereon.

The fourth lens element 740 with positive refractive power has an object-side surface 741 being convex in a paraxial region thereof and an image-side surface 742 being concave in a paraxial region thereof. The fourth lens element 740 is made of plastic material and has the object-side surface 741 and the image-side surface 742 being both aspheric. Furthermore, both of the object-side surface 741 and the image-side surface 742 of the fourth lens element 740 have at least one inflection point.

The fifth lens element 750 with negative refractive power has an object-side surface 751 being concave in a paraxial region thereof and an image-side surface 752 being concave in a paraxial region thereof. The fifth lens element 750 is made of plastic material and has the object-side surface 751 and the image-side surface 752 being both aspheric. Furthermore, both of the object-side surface 751 and the image-side surface 752 of the fifth lens element 750 have at least one inflection point, and the image-side surface 752 of the fifth lens element 750 has at least one convex shape in an off-axial region thereon.

The IR-cut filter 760 is made of glass material and located between the fifth lens element 750 and the image plane 770, and will not affect a focal length of the image capturing optical lens assembly.

The detailed optical data of the 7th embodiment are shown in Table 13 and the aspheric surface data are shown in Table 14 below.

TABLE 13

7th Embodiment
f = 3.97 mm, Fno = 2.25, HFOV = 36.0 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.276 | | | | |
| 2 | Lens 1 | 1.649 | ASP | 0.460 | Plastic | 1.544 | 55.9 | 3.13 |
| 3 | | 47.057 | ASP | 0.246 | | | | |
| 4 | Lens 2 | −100.000 | ASP | 0.207 | Plastic | 1.640 | 23.3 | −4.23 |
| 5 | | 2.781 | ASP | 0.269 | | | | |
| 6 | Lens 3 | 20.598 | ASP | 1.319 | Plastic | 1.544 | 55.9 | 11.56 |
| 7 | | −8.849 | ASP | 0.257 | | | | |
| 8 | Lens 4 | 1.930 | ASP | 0.421 | Plastic | 1.544 | 55.9 | 3.89 |
| 9 | | 19.950 | ASP | 0.633 | | | | |
| 10 | Lens 5 | −2.275 | ASP | 0.350 | Plastic | 1.535 | 55.7 | −2.63 |
| 11 | | 3.897 | ASP | 0.315 | | | | |
| 12 | IR-cut filter | Plano | | 0.300 | Glass | 1.517 | 64.2 | — |
| 13 | | Plano | | 0.274 | | | | |
| 14 | Image | Plano | | — | | | | |

Note:
Reference wavelength is 587.6 nm (d-line).

TABLE 14

Aspheric Coefficients

| Surface # | 2 | 3 | 4 | 5 | 6 |
|---|---|---|---|---|---|
| k = | 4.3736E−01 | 8.9775E+01 | −1.0000E+00 | −2.2375E+00 | −3.5360E+01 |
| A4 = | −6.3412E−03 | 2.2890E−02 | −6.0383E−02 | −3.9894E−02 | −7.7502E−02 |
| A6 = | 9.4540E−02 | −1.6455E−02 | 8.6433E−02 | 1.3000E−01 | 9.3752E−02 |
| A8 = | −3.3261E−01 | 1.0292E−01 | −5.1080E−02 | −8.2287E−02 | −2.4226E−01 |

TABLE 14-continued

| Aspheric Coefficients | | | | | |
|---|---|---|---|---|---|
| A10 = | 7.3947E−01 | −1.2914E−01 | −1.2521E−01 | −3.8064E−02 | 4.0029E−01 |
| A12 = | −8.8369E−01 | −2.1946E−02 | −1.1528E−02 | 6.4062E−02 | −4.0597E−01 |
| A14 = | 5.6974E−01 | 1.5519E−01 | 2.8603E−01 | −1.2977E−02 | 2.1110E−01 |
| A16 = | −1.4886E−01 | −8.8257E−02 | −2.2465E−01 | 3.8592E−03 | −4.1689E−02 |
| Surface # | 7 | 8 | 9 | 10 | 11 |
| k = | 1.6571E+01 | −6.6261E+00 | 4.5341E+01 | −2.1370E−01 | −3.0642E−01 |
| A4 = | −2.4550E−01 | −7.5921E−02 | 6.3285E−02 | −6.2972E−02 | −9.9440E−02 |
| A6 = | 1.5167E−01 | 5.1264E−02 | −2.1952E−02 | 5.2867E−02 | 3.9455E−02 |
| A8 = | −7.7398E−02 | −9.2446E−02 | −2.3263E−02 | 3.1575E−03 | −1.0843E−02 |
| A10 = | 8.8838E−03 | 6.3647E−02 | 1.9042E−02 | −7.7797E−03 | 9.8141E−04 |
| A12 = | 1.6974E−02 | −2.8994E−02 | −5.6827E−03 | 2.1882E−03 | 1.6033E−04 |
| A14 = | −1.0644E−02 | 7.6737E−03 | 7.8574E−04 | −2.6225E−04 | −3.6680E−05 |
| A16 = | 1.9803E−03 | −7.9009E−04 | −4.1968E−05 | 1.2078E−05 | 1.8701E−06 |

In the 7th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 7th embodiment, so an explanation in this regard will not be provided again.

Moreover, these parameters can be calculated from Table 13 and Table 14 as the following values and satisfy the following conditions:

| 7th Embodiment | | | |
|---|---|---|---|
| f [mm] | 3.97 | R4/R3 | −0.03 |
| Fno | 2.25 | (R9 + R10)/(R9 − R10) | −0.26 |
| HFOV (deg.) | 36.0 | R7/f | 0.49 |
| V1/V3 | 1.00 | f4/R8 | 0.19 |
| CT3/CT1 | 2.87 | (f/R10) − (f/R9) | 2.76 |
| CT2/CT5 | 0.59 | f/f4 | 1.02 |
| T45/CT5 | 1.81 | |f4/f3| | 0.34 |
| Y41/CT4 | 2.33 | | |

Furthermore, in the image capturing optical lens assembly of the image capturing device according to the 7th embodiment, an axial distance between the first lens element 710 and the second lens element 720 is T12, an axial distance between the second lens element 720 and the third lens element 730 is T23, an axial distance between the third lens element 730 and the fourth lens element 740 is T34, the axial distance between the fourth lens element 740 and the fifth lens element 750 is T45, and T45 is greater than T12, T23 and T34.

8th Embodiment

Figure 15:
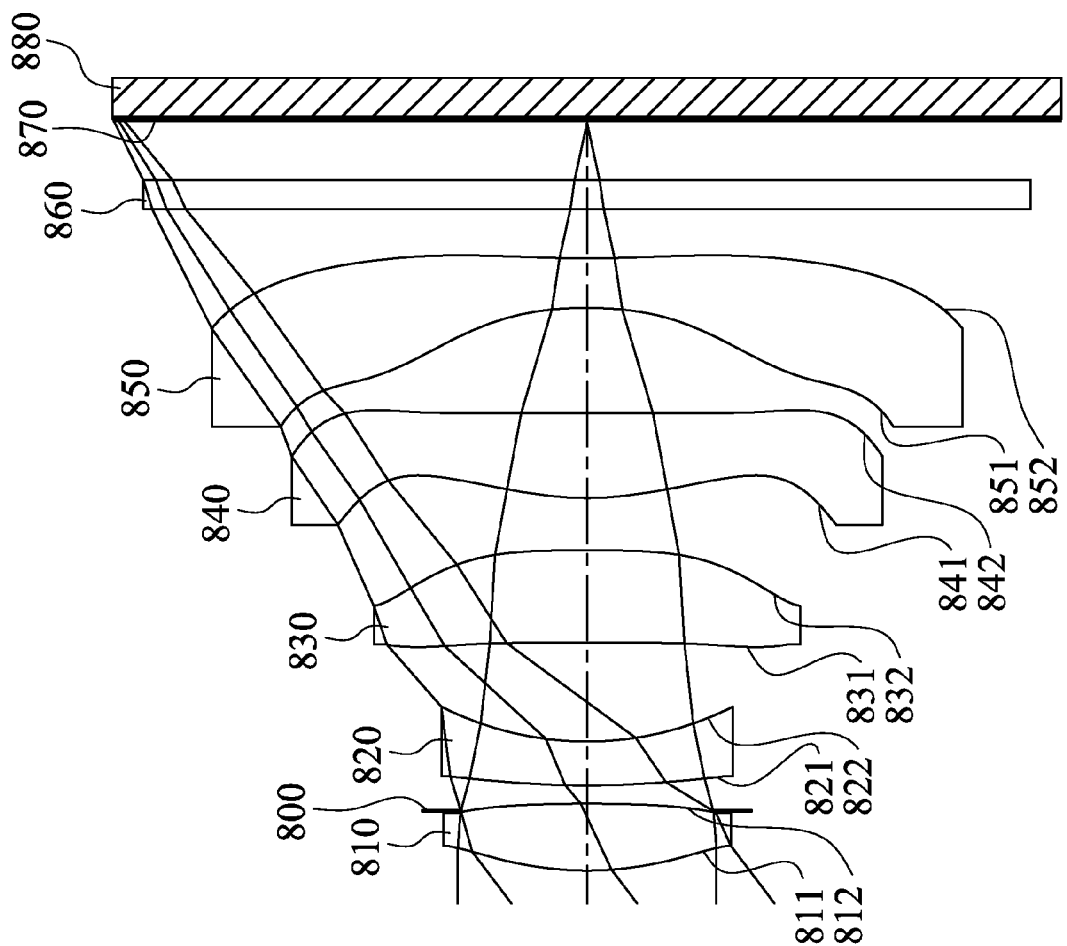
FIG. 15 is a schematic view of an image capturing device according to the 8th embodiment of the present disclosure.
Figure 16:
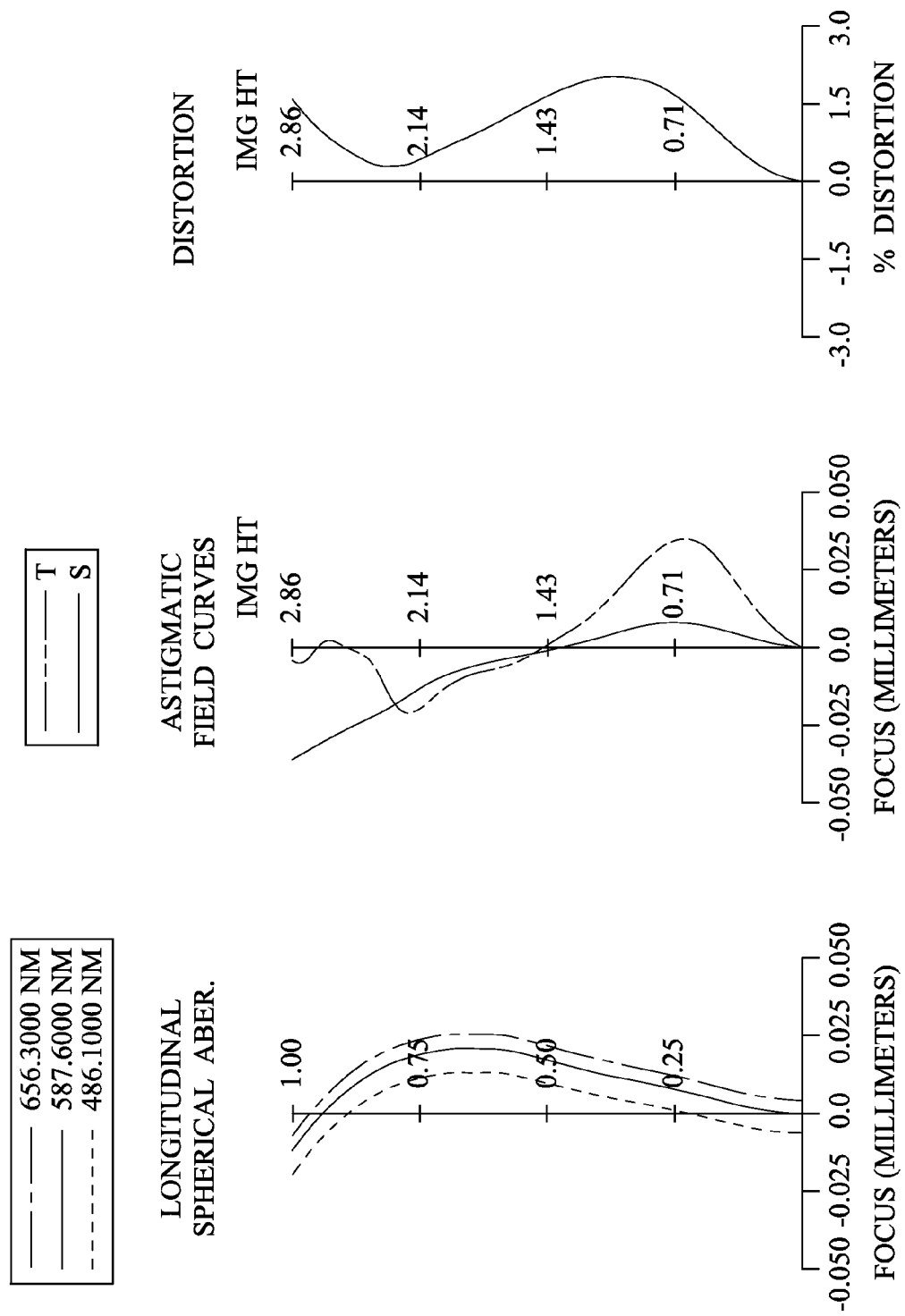
FIG. 16 shows spherical aberration curves, astigmatic field curves and a distortion curve of the image capturing device according to the 8th embodiment.

FIG. 15 is a schematic view of an image capturing device according to the 8th embodiment of the present disclosure. FIG. 16 shows, in order from left to right, spherical aberration curves, astigmatic field curves and a distortion curve of the image capturing device according to the 8th embodiment.

In FIG. 15, the image capturing device includes the image capturing optical lens assembly (its reference numeral is omitted) of the present disclosure and an image sensor 880. The image capturing optical lens assembly includes, in order from an object side to an image side, a first lens element 810, an aperture stop 800, a second lens element 820, a third lens element 830, a fourth lens element 840, a fifth lens element 850, an IR-cut filter 860 and an image plane 870. The image sensor 880 is located on or near the image plane 870 of the image capturing optical lens assembly. The image capturing optical lens assembly has a total of five lens elements (810-850) with refractive power. Moreover, there is an air gap in a paraxial region between any two of the first lens element 810, the second lens element 820, the third lens element 830, the fourth lens element 840, and the fifth lens element 850 that are adjacent to each other.

The first lens element 810 with positive refractive power has an object-side surface 811 being convex in a paraxial region thereof and an image-side surface 812 being convex in a paraxial region thereof. The first lens element 810 is made of plastic material and has the object-side surface 811 and the image-side surface 812 being both aspheric. Furthermore, the object-side surface 811 of the first lens element 810 has at least one inflection point.

The second lens element 820 with negative refractive power has an object-side surface 821 being convex in a paraxial region thereof and an image-side surface 822 being concave in a paraxial region thereof. The second lens element 820 is made of plastic material and has the object-side surface 821 and the image-side surface 822 being both aspheric.

The third lens element 830 with positive refractive power has an object-side surface 831 being convex in a paraxial region thereof and an image-side surface 832 being convex in a paraxial region thereof. The third lens element 830 is made of plastic material and has the object-side surface 831 and the image-side surface 832 being both aspheric. Furthermore, both of the object-side surface 831 and the image-side surface 832 of the third lens element 830 have at least one inflection point, and the object-side surface 831 of the third lens element 830 has at least one concave shape in an off-axial region thereof.

The fourth lens element 840 with positive refractive power has an object-side surface 841 being convex in a paraxial region thereof and an image-side surface 842 being concave in a paraxial region thereof. The fourth lens element 840 is made of plastic material and has the object-side surface 841 and the image-side surface 842 being both aspheric. Furthermore, both of the object-side surface 841 and the image-side surface 842 of the fourth lens element 840 have at least one inflection point.

The fifth lens element 850 with negative refractive power has an object-side surface 851 being concave in a paraxial region thereof and an image-side surface 852 being concave in a paraxial region thereof. The fifth lens element 850 is made of plastic material and has the object-side surface 851 and the image-side surface 852 being both aspheric. Furthermore, both of the object-side surface 851 and the image-side surface 852 of the fifth lens element 850 have at least one inflection point, and the image-side surface 852 of the fifth lens element 850 has at least one convex shape in an off-axial region thereon.

The IR-cut filter 860 is made of glass material and located between the fifth lens element 850 and the image plane 870, and will not affect a focal length of the image capturing optical lens assembly.

The detailed optical data of the 8th embodiment are shown in Table 15 and the aspheric surface data are shown in Table 16 below.

TABLE 15

8th Embodiment
f = 3.70 mm, Fno = 2.35, HFOV = 37.2 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | 1.970 | ASP | 0.408 | Plastic | 1.535 | 55.7 | 2.99 |
| 2 | | −7.917 | ASP | −0.046 | | | | |
| 3 | Ape. Stop | Plano | | 0.156 | | | | |
| 4 | Lens 2 | 5.829 | ASP | 0.267 | Plastic | 1.639 | 23.5 | −4.64 |
| 5 | | 1.930 | ASP | 0.603 | | | | |
| 6 | Lens 3 | 188.386 | ASP | 0.561 | Plastic | 1.535 | 55.7 | 44.11 |
| 7 | | −26.953 | ASP | 0.318 | | | | |
| 8 | Lens 4 | 1.870 | ASP | 0.518 | Plastic | 1.544 | 55.9 | 3.50 |
| 9 | | 95.651 | ASP | 0.640 | | | | |
| 10 | Lens 5 | −2.316 | ASP | 0.300 | Plastic | 1.535 | 55.7 | −3.13 |
| 11 | | 6.331 | ASP | 0.300 | | | | |
| 12 | IR-cut filter | Plano | | 0.175 | Glass | 1.517 | 64.2 | — |
| 13 | | Plano | | 0.376 | | | | |
| 14 | Image | Plano | | — | | | | |

Note:
Reference wavelength is 587.6 nm (d-line).

TABLE 16

Aspheric Coefficients

| Surface # | 1 | 2 | 4 | 5 | 6 |
|---|---|---|---|---|---|
| k = | −1.0316E+00 | −1.0000E+00 | −1.0000E+00 | −1.8704E+00 | −1.0000E+00 |
| A4 = | −3.9343E−02 | −1.0419E−04 | 1.7293E−04 | −2.2609E−02 | −8.0419E−02 |
| A6 = | 1.7385E−01 | −6.4773E−02 | −1.8857E−02 | 3.5183E−01 | 1.0124E−01 |
| A8 = | −9.0515E−01 | 7.1221E−02 | 1.1784E−01 | −1.1159E+00 | −1.5709E−01 |
| A10 = | 2.5398E+00 | −1.3759E−01 | −3.2119E−01 | 1.8444E+00 | 1.8883E−01 |
| A12 = | −4.5346E+00 | −8.6750E−02 | 1.6744E−01 | −1.4337E+00 | −1.1282E−01 |
| A14 = | 4.2615E+00 | 1.2564E−01 | 2.0728E−01 | 2.4869E−01 | 3.3104E−02 |
| A16 = | −1.6800E+00 | 5.0635E−03 | −1.5123E−01 | 1.7070E−01 | −3.6611E−03 |

| Surface # | 7 | 8 | 9 | 10 | 11 |
|---|---|---|---|---|---|
| k = | −1.0000E+00 | −7.1093E+00 | 3.8766E+00 | 3.4465E−01 | −7.3762E+00 |
| A4 = | −2.6917E−01 | −1.0254E−01 | −6.9935E−02 | −2.2277E−01 | −1.0057E−01 |
| A6 = | 1.9810E−01 | 1.3980E−01 | 1.5166E−01 | 2.5995E−01 | 5.2951E−02 |
| A8 = | −1.8583E−01 | −1.8631E−01 | −1.3029E−01 | −1.5439E−01 | −1.8926E−02 |
| A10 = | 1.2896E−01 | 1.3775E−01 | 6.5421E−02 | 8.6344E−02 | 4.4060E−03 |
| A12 = | −5.2334E−02 | −7.1449E−02 | −2.1196E−02 | −3.3936E−02 | −6.6907E−04 |
| A14 = | 1.5181E−02 | 2.0669E−02 | 3.7656E−03 | 6.9354E−03 | 5.9706E−05 |
| A16 = | −2.0442E−03 | −2.3174E−03 | −2.7214E−04 | −5.5309E−04 | −2.4728E−06 |

| 8th Embodiment | | | |
|---|---|---|---|
| f [mm] | 3.70 | R4/R3 | 0.33 |
| Fno | 2.35 | (R9 + R10)/(R9 − R10) | −0.46 |
| HFOV (deg.) | 37.2 | R7/f | 0.51 |
| V1/V3 | 1.00 | f4/R8 | 0.04 |
| CT3/CT1 | 1.38 | (f/R10) − (f/R9) | 2.18 |
| CT2/CT5 | 0.89 | f/f4 | 1.06 |
| T45/CT5 | 2.13 | |f4/f3| | 0.08 |
| Y41/CT4 | 1.98 | | |

In the 8th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 8th embodiment, so an explanation in this regard will not be provided again.

Moreover, these parameters can be calculated from Table 15 and Table 16 as the following values and satisfy the following conditions:

Furthermore, in the image capturing optical lens assembly of the image capturing device according to the 8th embodiment, an axial distance between the first lens element 810 and the second lens element 820 is T12, an axial distance between the second lens element 820 and the third lens element 830 is T23, an axial distance between the third lens element 830 and the fourth lens element 840 is T34, the axial distance between the fourth lens element 840 and the fifth lens element 850 is T45, and T45 is greater than T12, T23 and T34.

9th Embodiment

Figure 17:
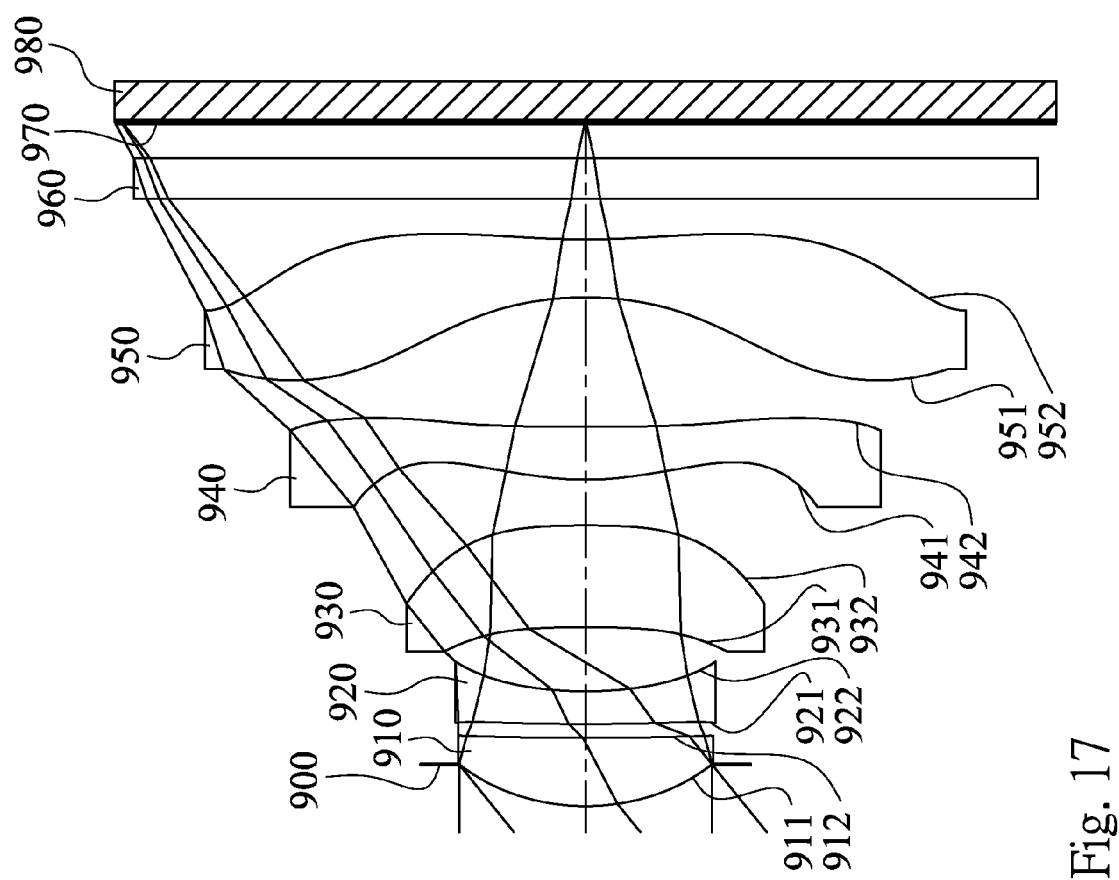
FIG. 17 is a schematic view of an image capturing device according to the 9th embodiment of the present disclosure.
Figure 18:
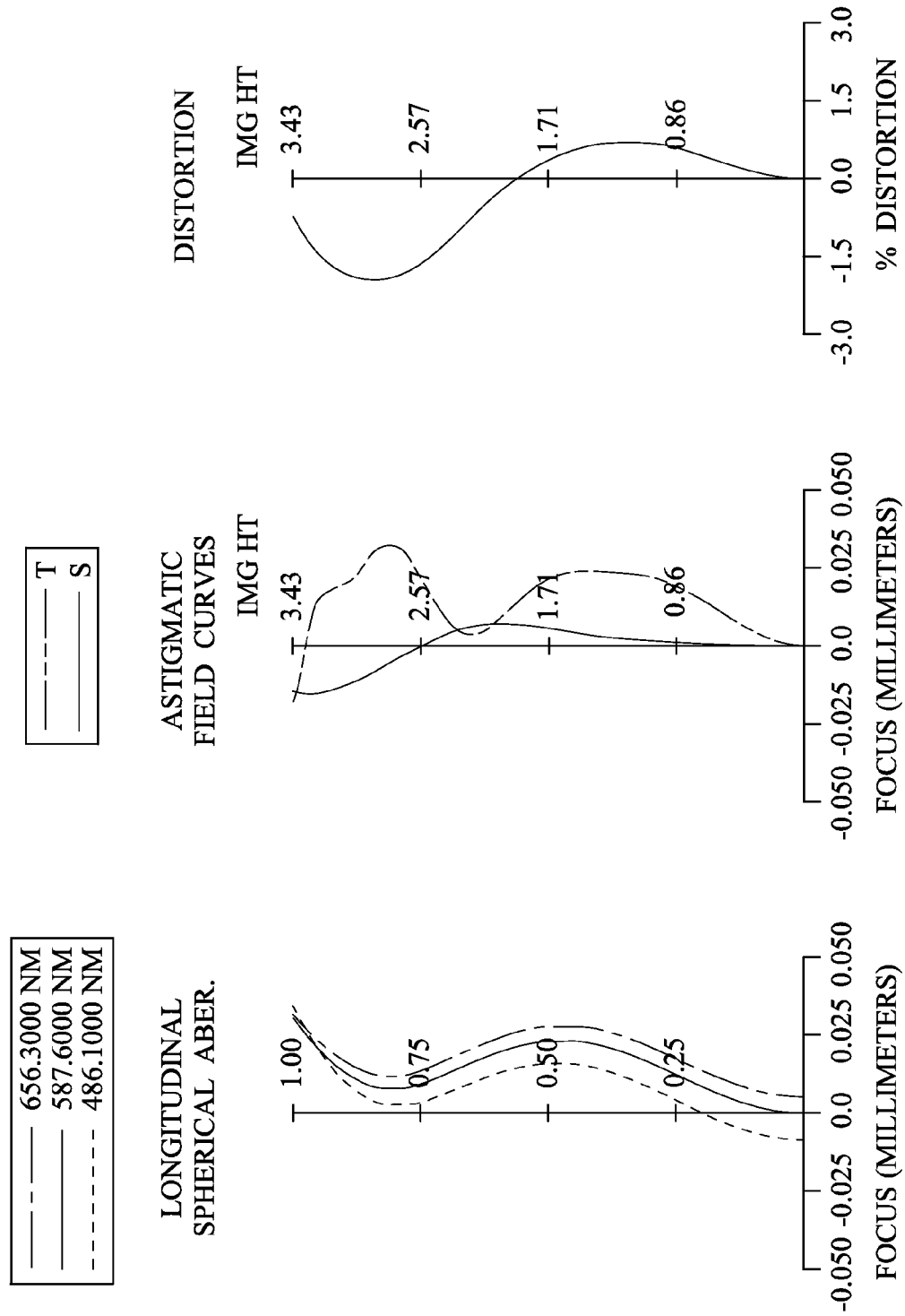
FIG. 18 shows spherical aberration curves, astigmatic field curves and a distortion curve of the image capturing device according to the 9th embodiment.

FIG. 17 is a schematic view of an image capturing device according to the 9th embodiment of the present disclosure. FIG. 18 shows, in order from left to right, spherical aberration curves, astigmatic field curves and a distortion curve of the image capturing device according to the 9th embodiment.

In FIG. 17, the image capturing device includes the image capturing optical lens assembly (its reference numeral is omitted) of the present disclosure and an image sensor 980. The image capturing optical lens assembly includes, in order from an object side to an image side, an aperture stop 900, a first lens element 910, a second lens element 920, a third lens element 930, a fourth lens element 940, a fifth lens element 950, an IR-cut filter 960 and an image plane 970. The image sensor 980 is located on or near the image plane 970 of the image capturing optical lens assembly. The image capturing optical lens assembly has a total of five lens elements (910-950) with refractive power. Moreover, there is an air gap in a paraxial region between any two of the first lens element 910, the second lens element 920, the third lens element 930, the fourth lens element 940, and the fifth lens element 950 that are adjacent to each other.

The first lens element 910 with positive refractive power has an object-side surface 911 being convex in a paraxial region thereof and an image-side surface 912 being concave in a paraxial region thereof. The first lens element 910 is made of plastic material and has the object-side surface 911 and the image-side surface 912 being both aspheric. Furthermore, the image-side surface 912 of the first lens element 910 has at least one inflection point.

The second lens element 920 with negative refractive power has an object-side surface 921 being convex in a paraxial region thereof and an image-side surface 922 being concave in a paraxial region thereof. The second lens element 920 is made of plastic material and has the object-side surface 921 and the image-side surface 922 being both aspheric. Furthermore, the object-side surface 921 of the second lens element 920 has at least one inflection point.

The third lens element 930 with negative refractive power has an object-side surface 931 being concave in a paraxial region thereof and an image-side surface 932 being convex in a paraxial region thereof. The third lens element 930 is made of plastic material and has the object-side surface 931 and the image-side surface 932 being both aspheric. The object-side surface 931 of the third lens element 930 has at least one inflection point. Furthermore, the image-side surface 932 of the third lens element 930 has at least one convex shape in an off-axial region thereon.

The fourth lens element 940 with positive refractive power has an object-side surface 941 being convex in a paraxial region thereof and an image-side surface 942 being planar in a paraxial region thereof. The fourth lens element 940 is made of plastic material and has the object-side surface 941 and the image-side surface 942 being both aspheric. Furthermore, both of the object-side surface 941 and the image-side surface 942 of the fourth lens element 940 have at least one inflection point.

The fifth lens element 950 with negative refractive power has an object-side surface 951 being concave in a paraxial region thereof and an image-side surface 952 being concave in a paraxial region thereof. The fifth lens element 950 is made of plastic material and has the object-side surface 951 and the image-side surface 952 being both aspheric. Furthermore, both of the object-side surface 951 and the image-side surface 952 of the fifth lens element 950 have at least one inflection point, and the image-side surface 952 of the fifth lens element 950 has at least one convex shape in an off-axial region thereon.

The IR-cut filter 960 is made of glass material and located between the fifth lens element 950 and the image plane 970, and will not affect a focal length of the image capturing optical lens assembly.

The detailed optical data of the 9th embodiment are shown in Table 17 and the aspheric surface data are shown in Table 18 below.

TABLE 17

9th Embodiment
f = 4.26 mm, Fno = 2.28, HFOV = 39.0 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.308 | | | | |
| 2 | Lens 1 | 1.640 | ASP | 0.505 | Plastic | 1.544 | 55.9 | 3.11 |
| 3 | | 44.874 | ASP | 0.102 | | | | |
| 4 | Lens 2 | 17.007 | ASP | 0.241 | Plastic | 1.640 | 23.3 | −5.19 |
| 5 | | 2.765 | ASP | 0.475 | | | | |
| 6 | Lens 3 | −8.902 | ASP | 0.751 | Plastic | 1.530 | 55.8 | −148.63 |
| 7 | | −10.330 | ASP | 0.338 | | | | |
| 8 | Lens 4 | 2.290 | ASP | 0.392 | Plastic | 1.544 | 55.9 | 4.21 |
| 9 | | ∞ | ASP | 0.955 | | | | |
| 10 | Lens 5 | −2.519 | ASP | 0.428 | Plastic | 1.530 | 55.8 | −3.23 |
| 11 | | 5.636 | ASP | 0.300 | | | | |
| 12 | IR-cut filter | Plano | | 0.300 | Glass | 1.517 | 64.2 | — |
| 13 | | Plano | | 0.268 | | | | |
| 14 | Image | Plano | | — | | | | |

Note:
Reference wavelength is 587.6 nm (d-line).

TABLE 18

Aspheric Coefficients

| Surface # | 2 | 3 | 4 | 5 | 6 |
|---|---|---|---|---|---|
| k = | 3.2741E−01 | −1.0000E+00 | −1.0000E+00 | 1.5555E+00 | 1.2505E+01 |
| A4 = | 2.8699E−04 | 3.3699E−03 | −2.6296E−02 | −3.9374E−03 | −1.2729E−01 |
| A6 = | 6.5559E−03 | 1.8296E−02 | 6.1647E−02 | 6.4789E−02 | 1.2930E−01 |

TABLE 18-continued

| Aspheric Coefficients | | | | | |
|---|---|---|---|---|---|
| A8 = | 1.2051E−04 | 1.0272E−02 | −2.2649E−02 | −1.3981E−02 | −2.2860E−01 |
| A10 = | 4.6752E−03 | −1.1594E−02 | −4.3108E−02 | −2.8004E−03 | 1.0725E−01 |
| A12 = | 6.5874E−03 | −1.2557E−03 | 2.5452E−03 | −1.2630E−03 | 1.6053E−01 |
| A14 = | 4.1758E−03 | −9.0489E−03 | 1.5200E−02 | −9.4350E−03 | −2.4388E−01 |
| A16 = | −9.2822E−03 | −1.1984E−02 | −2.6291E−02 | 1.7799E−02 | 1.0223E−01 |

| Surface # | 7 | 8 | 9 | 10 | 11 |
|---|---|---|---|---|---|
| k = | 2.4551E+01 | −8.0026E+00 | 0.0000E+00 | −2.9051E−01 | 2.0369E+00 |
| A4 = | −2.7046E−01 | −6.5216E−02 | 4.5282E−02 | −5.4318E−02 | −6.5725E−02 |
| A6 = | 2.5622E−01 | 7.3060E−02 | −3.0939E−03 | 3.5047E−02 | 2.1209E−02 |
| A8 = | −3.7035E−01 | −1.0440E−01 | −1.9231E−02 | −3.9087E−03 | −5.9471E−03 |
| A10 = | 3.8367E−01 | 7.3587E−02 | 1.0761E−02 | −6.0924E−04 | 1.0318E−03 |
| A12 = | −2.4617E−01 | −3.1191E−02 | −2.5984E−03 | 2.0493E−04 | −1.1884E−04 |
| A14 = | 8.4044E−02 | 7.3414E−03 | 3.0454E−04 | −2.0228E−05 | 8.9608E−06 |
| A16 = | −1.1443E−02 | −7.2716E−04 | −1.4356E−05 | 7.2343E−07 | −3.1145E−07 |

In the 9th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 9th embodiment, so an explanation in this regard will not be provided again.

Moreover, these parameters can be calculated from Table 17 and Table 18 as the following values and satisfy the following conditions:

| 9th Embodiment | | | |
|---|---|---|---|
| f [mm] | 4.26 | R4/R3 | 0.16 |
| Fno | 2.28 | (R9 + R10)/(R9 − R10) | −0.38 |
| HFOV (deg.) | 39.0 | R7/f | 0.54 |
| V1/V3 | 1.00 | f4/R8 | 0 |
| CT3/CT1 | 1.49 | (f/R10) − (f/R9) | 2.45 |
| CT2/CT5 | 0.56 | f/f4 | 1.01 |
| T45/CT5 | 2.23 | |f4/f3| | 0.03 |
| Y41/CT4 | 2.81 | | |

Furthermore, in the image capturing optical lens assembly of the image capturing device according to the 9th embodiment, an axial distance between the first lens element 910 and the second lens element 920 is T12, an axial distance between the second lens element 920 and the third lens element 930 is T23, an axial distance between the third lens element 930 and the fourth lens element 940 is T34, the axial distance between the fourth lens element 940 and the fifth lens element 950 is T45, and T45 is greater than T12, T23 and T34.

10th Embodiment

Figure 20:
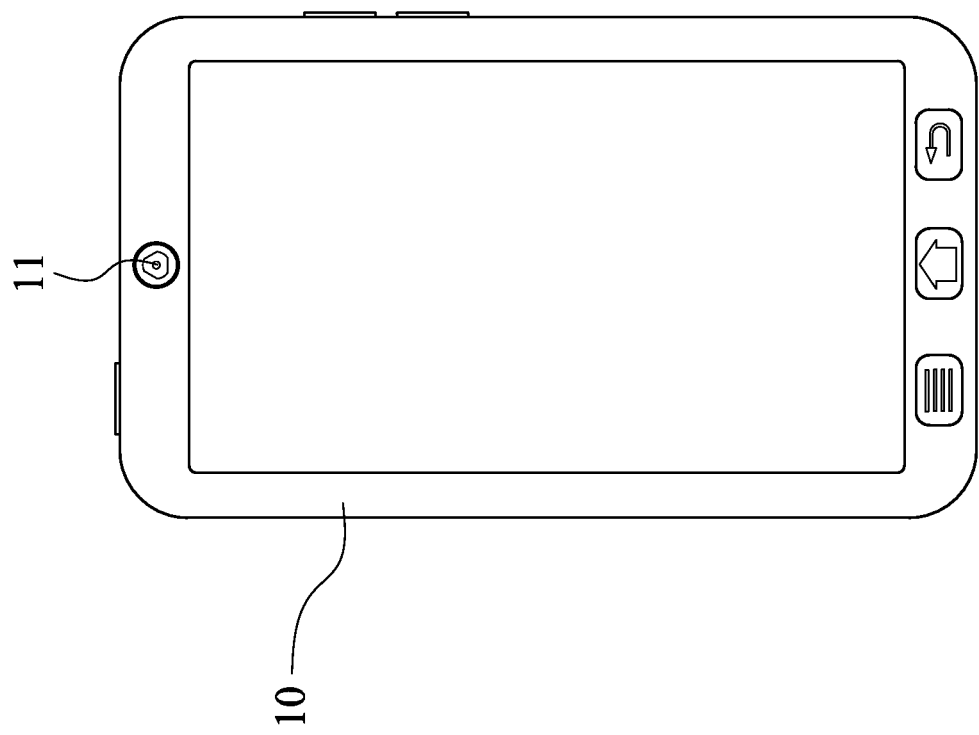
FIG. 20 shows a mobile terminal according to the 10th embodiment of the present disclosure.

FIG. 20 is a schematic view of a mobile terminal 10 according to the 10th embodiment of the present disclosure. The mobile terminal 10 of the 10th embodiment is a smart phone, wherein the mobile terminal 10 includes an image capturing device 11. The image capturing device 11 includes an image capturing optical lens assembly (its reference numeral is omitted) according to the present disclosure and an image sensor (its reference numeral is omitted), wherein the image sensor is located on or near an image plane of the image capturing optical lens assembly.

11th Embodiment

Figure 21:
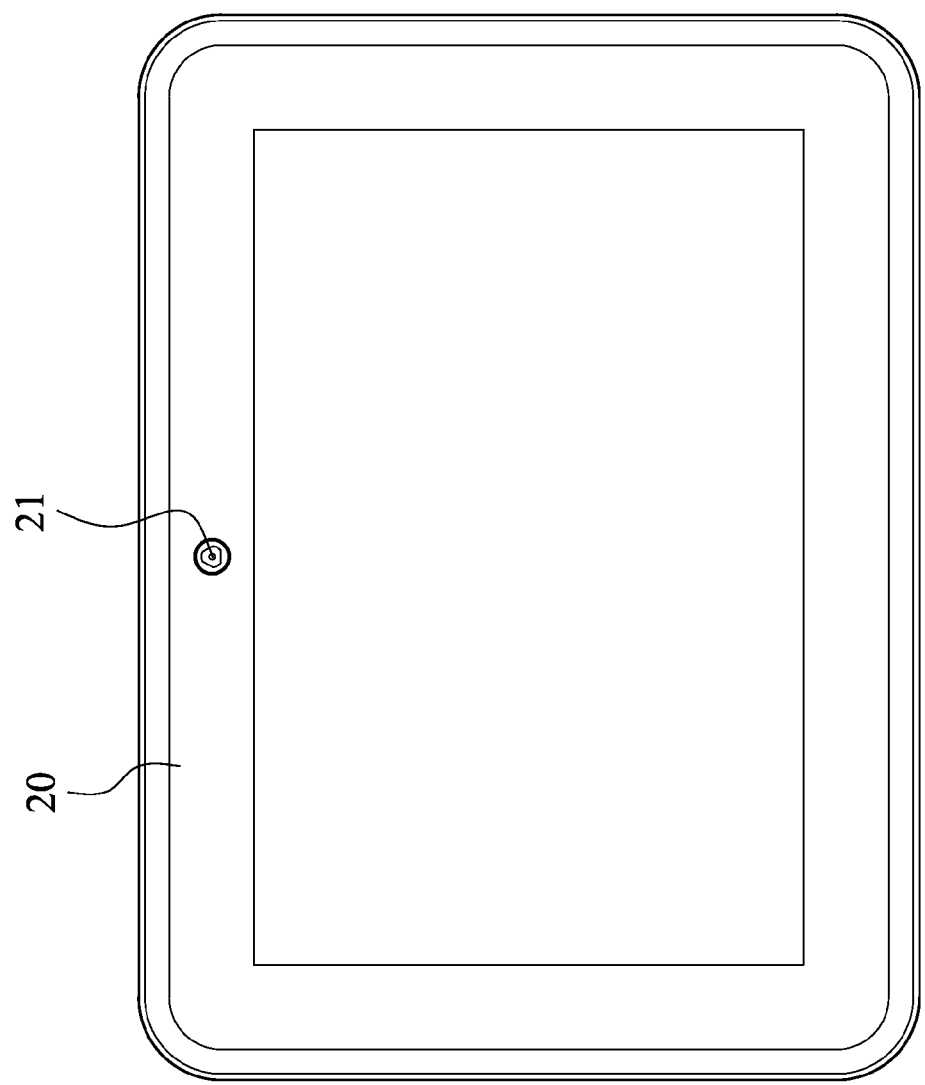
FIG. 21 shows a mobile terminal according to the 11th embodiment of the present disclosure.

FIG. 21 is a schematic view of a mobile terminal 20 according to the 11th embodiment of the present disclosure. The mobile terminal 20 of the 11th embodiment is a tablet personal computer, wherein the mobile terminal 20 includes an image capturing device 21. The image capturing device 21 includes an image capturing optical lens assembly (its reference numeral is omitted) according to the present disclosure and an image sensor (its reference numeral is omitted), wherein the image sensor is located on or near an image plane of the image capturing optical lens assembly.

12th Embodiment

Figure 22:
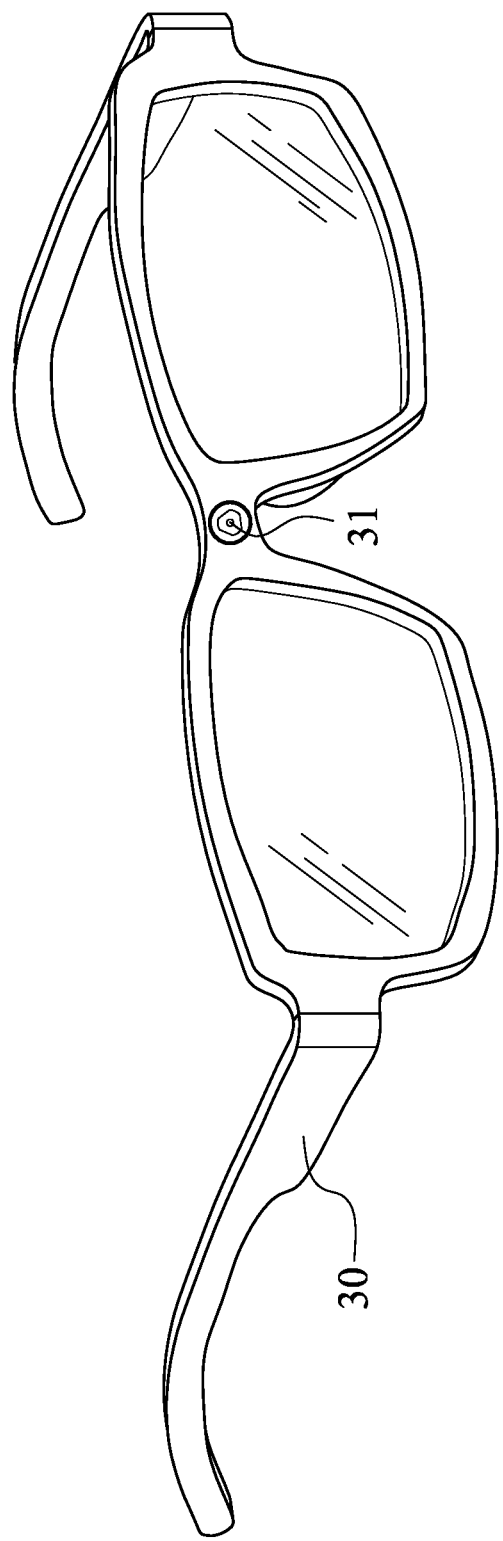
FIG. 22 shows a mobile terminal according to the 12th embodiment of the present disclosure.

FIG. 22 is a schematic view of a mobile terminal 30 according to the 12th embodiment of the present disclosure. The mobile terminal 30 of the 12th embodiment is a head-mounted display, wherein the mobile terminal 30 includes an image capturing device 31. The image capturing device 31 includes an image capturing optical lens assembly (its reference numeral is omitted) according to the present disclosure and an image sensor (its reference numeral is omitted), wherein the image sensor is located on or near an image plane of the image capturing optical lens assembly.

The foregoing description, for purpose of explanation, has been described with reference to specific embodiments. It is to be noted that TABLES 1-18 show different data of the different embodiments; however, the data of the different embodiments are obtained from experiments. The embodiments were chosen and described in order to best explain the principles of the disclosure and its practical applications, to thereby enable others skilled in the art to best utilize the disclosure and various embodiments with various modifications as are suited to the particular use contemplated. The embodiments depicted above and the appended drawings are exemplary and are not intended to be exhaustive or to limit the scope of the present disclosure to the precise forms disclosed. Many modifications and variations are possible in view of the above teachings.

What is claimed is:

1. An image capturing optical lens assembly comprising, in order from an object side to an image side:
    a first lens element with positive refractive power having an object-side surface being convex in a paraxial region thereof;
    a second lens element having negative refractive power;
    a third lens element having refractive power;
    a fourth lens element with positive refractive power having an object-side surface being convex in a paraxial region thereof and an image-side surface being concave or planar in a paraxial region thereof, wherein the object-side surface and the image-side surface of the fourth lens element are aspheric, and at least one of the object-side surface and the image-side surface of the fourth lens element has at least one inflection point thereon; and a fifth lens element with negative refractive power having an object-side surface being concave in a paraxial region thereof and an image-side surface being concave in a paraxial region thereof, wherein the object-side surface and the image-side surface of the fifth lens element are aspheric, and the image-side surface of the fifth lens element has at least one convex shape in an off-axial region thereon;

wherein the image capturing optical lens assembly has a total of five lens elements with refractive power, there is an air gap in a paraxial region between any two of the first lens element, the second lens element, the third lens element, the fourth lens element, and the fifth lens element that are adjacent to each other, a focal length of the image capturing optical lens assembly is f, a focal length of the fourth lens element is f4, a curvature radius of the image-side surface of the fourth lens element is R8, a curvature radius of the object-side surface of the fifth lens element is R9, a curvature radius of the image-side surface of the fifth lens element is R10, an axial distance between the fourth lens element and the fifth lens element is T45, a central thickness of the fifth lens element is CT5, and the following conditions are satisfied:

$1.20 < (f/R10) - (f/R9)$;

$0 \leq f4/R8$;

$0.4 < f/f4$; and $1.1 < T45/CT5$.

2. The image capturing optical lens assembly of claim 1, wherein the second lens element has an image-side surface being concave in a paraxial region thereof.

3. The image capturing optical lens assembly of claim 2, wherein a central thickness of the second lens element is CT2, the central thickness of the fifth lens element is CT5, and the following condition is satisfied:

$0.20 < CT2/CT5 < 1.0$.

4. The image capturing optical lens assembly of claim 2, wherein an Abbe number of the first lens element is V1, an Abbe number of the third lens element is V3, and the following condition is satisfied:

$0.80 < V1/V3 < 1.50$.

5. The image capturing optical lens assembly of claim 1, wherein an axial distance between the first lens element and the second lens element is T12, an axial distance between the second lens element and the third lens element is T23, an axial distance between the third lens element and the fourth lens element is T34, the axial distance between the fourth lens element and the fifth lens element is T45, and T45 is greater than T12, T23 and T34.

6. The image capturing optical lens assembly of claim 5, wherein a curvature radius of the object-side surface of the fourth lens element is R7, the focal length of the image capturing optical lens assembly is f, and the following condition is satisfied:

$0.20 < R7/f < 0.70$.

7. The image capturing optical lens assembly of claim 1, wherein the axial distance between the fourth lens element and the fifth lens element is T45, the central thickness of the fifth lens element is CT5, and the following condition is satisfied:

$1.25 < T45/CT5 < 2.50$.

8. The image capturing optical lens assembly of claim 1, wherein the focal length of the image capturing optical lens assembly is f, the curvature radius of the object-side surface of the fifth lens element is R9, the curvature radius of the image-side surface of the fifth lens element is R10, and the following condition is satisfied:

$1.80 < (f/R10) - (f/R9) < 5.00$.

9. The image capturing optical lens assembly of claim 1, wherein a focal length of the third lens element is f3, the focal length of the fourth lens element is f4, and the following condition is satisfied:

$|f4/f3| < 0.50$.

10. The image capturing optical lens assembly of claim 1, wherein a curvature radius of the object-side surface of the second lens element is R3, a curvature radius of the image-side surface of the second lens element is R4, and the following condition is satisfied:

$0.15 < R4/R3 < 0.35$.

11. The image capturing optical lens assembly of claim 1, wherein a central thickness of the first lens element is CT1, a central thickness of the third lens element is CT3, and the following condition is satisfied:

$1.60 < CT3/CT1 < 3.50$.

12. The image capturing optical lens assembly of claim 1, wherein the curvature radius of the object-side surface of the fifth lens element is R9, the curvature radius of the image-side surface of the fifth lens element is R10, and the following condition is satisfied:

$-1.00 < (R9+R10)/(R9-R10) < -0.25$.

13. The image capturing optical lens assembly of claim 1, wherein the focal length of the image capturing optical lens assembly is f, the focal length of the fourth lens element is f4, and the following condition is satisfied:

$0.75 < f/f4 < 1.50$.

14. The image capturing optical lens assembly of claim 1, wherein the third lens element has an object-side surface having at least one concave shape in an off-axial region thereon and an image-side surface having at least one convex shape in an off-axial region thereon.

15. The image capturing optical lens assembly of claim 1, wherein at least five of the object-side surface and the image-side surface among the first lens element, the second lens element, the third lens element, the fourth lens element, and the fifth lens element have at least one inflection point thereon.

16. The image capturing optical lens assembly of claim 1, wherein a vertical distance between a non-axial critical point on the object-side surface of the fourth lens element and an optical axis is Y41, a central thickness of the fourth lens element is CT4, and the following condition is satisfied:

$1.50 < Y41/CT4 < 3.50$.

17. An image capturing device, comprising:
the image capturing optical lens assembly of claim 1; and
an image sensor, wherein the image sensor is located on or near an image plane of the image capturing optical lens assembly.

18. A mobile terminal, comprising:
the image capturing device of claim 17.

* * * * *